(12) United States Patent
Yamasaki

(10) Patent No.: US 6,370,638 B1
(45) Date of Patent: Apr. 9, 2002

(54) APPARATUS AND METHOD OF COMPUTER PROGRAM CONTROL IN COMPUTER SYSTEMS USING PIPELINE PROCESSING

(75) Inventor: Masayuki Yamasaki, Daitou (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/195,529

(22) Filed: Nov. 18, 1998

(30) Foreign Application Priority Data

Nov. 21, 1997 (JP) ............................................. 9-321706

(51) Int. Cl.⁷ ................................................. G06F 9/00
(52) U.S. Cl. ........................................ 712/219; 712/245
(58) Field of Search ............................... 712/225, 219, 712/215, 245, 217, 244, 41; 711/140; 717/4

(56) References Cited

U.S. PATENT DOCUMENTS

| | | | | |
|---|---|---|---|---|
| 5,150,469 A | * | 9/1992 | Jouppi ......................... | 712/244 |
| 5,404,552 A | * | 4/1995 | Ikenaga ........................ | 712/41 |
| 5,694,574 A | * | 12/1997 | Abramson et al. .......... | 711/140 |
| 5,958,044 A | * | 9/1999 | Brown et al. ................ | 712/219 |
| 5,968,166 A | * | 10/1999 | Kakiage et al. ............. | 712/225 |

FOREIGN PATENT DOCUMENTS

| | | |
|---|---|---|
| JP | Hei 1-119829 | 5/1989 |
| JP | Hei02-178837 | 7/1990 |
| JP | Hei03-038727 | 2/1991 |
| JP | Hei03-136136 | 6/1991 |
| JP | Hei03-180931 | 8/1991 |

OTHER PUBLICATIONS

Patent Abstracts of Japan, Publication No. 03038727 A, Date of publication: Feb. 19, 1991.
Patent Abstracts of Japan, Publication No. 03136136 A, Date of publication: Jun. 10, 1991.
Patent Abstracts of Japan, Publication No. 03180931 A, Date of publication: Aug. 6, 1991.
Patent Abstracts of Japan, Publication No. 02178837 A, Date of publication: Jul. 11, 1990.
Patent Abstracts of Japan, publication No. 01119829A, published May 11, 1989.

* cited by examiner

Primary Examiner—Zarni Maung
Assistant Examiner—Jungwon Chang
(74) Attorney, Agent, or Firm—Rosenthal & Osha L.L.P.

(57) ABSTRACT

A program control apparatus for processing an instruction by using a pipeline processing for providing the effective stall control when resource competition is caused by the instructions is disclosed. The NOP field which shows the number of NOP (no operation processing) instruction is assigned in the instruction code with the possibility to cause the resource competition, and set the number of NOP for the stall and performs the NOP according to the NOP field. When the NOP field of the following instruction shows N, stall is executed by inserting and performing NOP of N piece by the stall control part 3 before the following instruction is executed. When the NOP field is assigned in both a preceding instruction and a following instruction, NOP of predetermined number N piece is inserted after the preceding instruction is executed, NOP of predetermined number M piece is inserted before the following instruction is executed, and the stall is achieved.

6 Claims, 19 Drawing Sheets

| Instruction type | Order | Example instruction | Number | Available field space | Appropriate Method |
|---|---|---|---|---|---|
| I | Preceding | MOV PR, GR | Small | A lot | First method |
| | Following | ADD GR, M(PR) | A lot | A lot | |
| II | Preceding | CMP GR, 0 | A lot | A lot | Second method |
| | Following | BRC Z, JMP | Small | A lot | |
| III | Preceding | MOV PR, Immediate value | Small | Small | Third method |
| | Following | ADD GR, M(PR) | A lot | A lot | |

*Fig. 2*

(a) Instruction length : 24 bits, NOP field last 2 bits

N=0 (Number of NOP is 0)

(b) Instruction length : 24 bits, NOP field last 2 bits

N=1 (Number of NOP is 1)

(c) Instruction length : 24 bits, NOP field last 2 bits

N=2 (Number of NOP is 2)

(a) Instruction length : 24 bits, NOP field last 1 bit

N=0 (Number of NOP is 0)

NOP field (b) Instruction length : 24 bits, NOP field last 1 bit

N=1 (Number of NOP is 1)

NOP field (a)    N   = MOV PR, GR
       N+2 = MOV GR, M(PR)

(b)    N   = MOV PR, GR
       N+1 = MOV GR, M(PR)

(a)  N-2= CMP GR, 0
     N   = BRC Z, JMP (b)  N-1= CMP GR, 0
     N   = BRC Z, JMP

APPARATUS AND METHOD OF COMPUTER PROGRAM CONTROL IN COMPUTER SYSTEMS USING PIPELINE PROCESSING

BACKGROUND OF THE INVENTION

1. Field of the Invention

The present invention relates to a program control method and an apparatus to achieve and perform stall processing in a computer system which executes instructions using pipeline processing.

2. Description of the Related Art

A computer system, such as a digital signal processor (hereinafter referring to as a DSP), which executes instructions using pipeline processing, includes a dedicated pointer register (hereinafter referring to as PR) to perform data memory addressing. In such a computer system, the competition of the resource such as register interference is occasionally caused between the instructions.

For instance, when a computer system uses four step pipeline, there are four processing stages, an instruction fetch stage (IF), an instruction decode 1 stage (D1), an instruction decode 2 stage (D2), and execution stage (EX). Data transmission from GR to PR is performed in the EX stage. Moreover, the data memory addressing for PR is performed in the D1 stage. Therefore, when an instruction with an access to the data memory (For instance, move operation from the data memory to GR:MOV GR, M(PR)) is performed just after an instruction for move operation (MOV PR,GR) from GR to PR, a memory addressing is performed by using the previous value of PR. This phenomenon causes a problem of the register interference.

In order to prevent the resource competition such as register interference and the like, an instruction stall method is adopted, which instruction stall method is inserting the no operation instruction (hereinafter referring to as NOP) between the instructions by which the resource competition is caused. An unexamined Japanese patent application Tokkai-Hei 1-119829 is known technology that solves and performs the problem of the resource competition. Technology disclosed in the unexamined Japanese patent application Tokkai-Hei 1-119829 prevents the register interference in computer system processing by stall control for defining a NOP field for specifying the number of NOP in an instruction code, detecting the specified number of NOP to be inserted by referencing the NOP field in an instruction code decoding stage, and inserting NOP of the predetermined number following the output of execution internal code of the instruction code.

According to this technology, the NOP field is assigned in the instruction code, the number of NOP which is inserted after execution of an instruction concerned is specified in the NOP field in the instruction causing the resource competition such as register interference etc. By the information specified in the NOP field, the stall is executed between a preceding instruction and the following instruction causing the resource competition such as register interference, and the resource competition can be prevented. When a computer system uses four step pipeline processing, memory addressing with new value of the PR renewed in the preceding instruction (instruction 1) processing can be performed by inserting 2 NOP between the preceding instruction 1 (MOV PR, GR) and the following instruction 2 (MOV GR, M(PR)).

However, in the above-mentioned unexamined Japanese patent application Tokkai-Hei 1-119829 concrete hardware configuration to achieve the stall control by referencing NOP field of the instruction code and inserting predetermined number of NOP is not disclosed at all.

According to the technology disclosed in the unexamined Japanese patent application Tokkai-Hei 1-119829, when a preceding instruction and a following instruction cause resource competition such as register interference, the NOP field is assigned in the preceding instruction, and the number of NOP is set and necessary number of NOP cycle is inserted after executing the preceding instruction.

However, the instruction codes where the NOP field is assigned becomes large when the kind of the preceding instruction causing the resource competition in the processing program occurs often. It is not preferable to overly increment the instruction code where the NOP field is assigned because it results in increasing the instruction code data amount.

Moreover, it is impossible to use this method according to the conventional method of assigning the NOP field in the preceding instruction code when there is not enough available field space for the NOP field.

SUMMARY OF THE INVENTION

Therefore, with the foregoing in mind, it is an object of the present invention to provide a program control apparatus for performing stall control by inserting NOP of the predetermined number into the process referring to the NOP field in an instruction code.

It is an another object of the present invention to provide a method of a program control and an apparatus for suppressing an increase of the instruction code data amount according to the NOP insertion for the stall control when resource competing.

It is an another object of the present invention to provide a method of the program control and an apparatus for improving the available field space compared with a conventional method when the available field space for the NOP field in the instruction code is small.

In order to achieve the objects, a program control method for performing stall processing for a computer system wherein an instruction is operated by using a pipeline processing in accordance with the invention includes the following steps: A step for assigning NOP field which indicates the number of NOP (no operation processing) in an instruction code and a step for decoding the instruction code and inserting N pieces of NOP when the number of NOP specified in the NOP field after executing the instruction corresponding to the instruction code.

According to the above processing, when a preceding instruction and the following instruction cause resource competition in the processing program, the program control method of this invention can insert NOP after the preceding instruction is executed and the following instruction is executed after NOP. The stall control can be achieved.

It is a preferable concerning setting the number of NOP to the NOP field that an assembler or a compiler automatically performs setting the number of NOP to the instruction code where there is a possibility of competition of the resource. As for the second and third method of the program control of the following description, automatically setting of the number of NOP is preferable.

Next, when a preceding instruction and a following instruction cause a resource competition in a processing program, and the kind of the following instruction is less than the kind of the preceding instruction, it is preferable that the NOP field is assigned in the following instruction code.

According to the above processing, when the kind of the following instruction is less than the kind of the preceding instruction among instructions causing resource competition, the number of instructions where the NOP field is assigned as a whole can be reduced by assigning the NOP field in the following instruction code rather than in the preceding instruction code.

In order to achieve the objects, a second program control method of this invention for performing stall processing for a computer system wherein an instruction is operated by using a pipeline processing, when a preceding instruction and a following instruction cause resource competition in a processing program, includes the following steps: A step for assigning the NOP field in both the preceding instruction code and the following instruction code, a step for inserting set number of NOP specified in the preceding instruction after executing the instruction corresponding to the preceding instruction code and a step for inserting set number of NOP specified in the following instruction before executing the instruction corresponding to the following instruction code.

According to the above processing, when there is not enough available field space in the instruction code of either a preceding instruction or a following instruction or both, the available field space will be improved by assigning the NOP field both in the preceding instruction code and in the following instruction code.

A program control apparatus of the present invention for processing an instruction by using a pipeline processing which instruction includes NOP field for specifying the number of NOP to be inserted includes the following parts: An instruction code storage part for storing first instruction codes, an address generation part for generating an address for outputting the first instruction code from the instruction code storage part and a stall control part for inputting the first instruction code, for controlling an output of a stop signal to stop a pipeline processing stage to the address generation part temporarily based on the result of the detection whether inputted first instruction code includes NOP field or not, and for controlling an output signal of either the first instruction code or a NOP code as a second instruction code.

According to the above configuration, the apparatus of the present invention can temporarily stop the pipeline processing stage and stall control according to the detection result whether there is NOP field in the input instruction code or not.

It is preferable that the program control apparatus wherein the stall control part further includes following parts: A first instruction register latches the first instruction code which is read out from the instruction code storage part and a switch part is for inputting the first instruction code outputted from the first instruction register and NOP code and for selecting and outputting either the first instruction code or NOP code as an second instruction code based on a switching signal. Also a temporary pipeline stop part for inputting the second instruction code which is outputted from the switch part, for detecting whether the inputted second instruction code is an instruction which includes NOP field or not, for controlling output of the stop signal to the address generation part and the first instruction register based on the detecting result, and for controlling the output of the switching signal to the switch part is included.

According to the above configuration, NOP can be executed by a second instruction code is outputted and a pipeline processing stage is stopped temporarily when the first input instruction code is an instruction code which has the NOP field.

In this case, the second instruction code is outputted from stall control part, the second instruction code is executed before NOP.

Next, it is preferable that the stall control part further includes the following parts: A first instruction register latches the first instruction code which read out from the instruction code storage part and a second instruction register latches the first instruction code which is read out from the first instruction register. Also a switch part for inputting the first instruction code outputted from the second instruction register and NOP code and for selecting and outputting either the first instruction code or NOP code as an second instruction code based on a switching signal and a temporary pipeline stop part for inputting the first instruction code which is outputted from the first instruction register, for detecting whether the inputted first instruction code is an instruction which includes NOP field or not, for controlling output of the stop signal to the address generation part and both the first instruction register and second instruction register based on the detecting result, and for controlling the output of the switching signal to the switch part are included.

According to the above configuration, when the first instruction code is an instruction code which has the NOP field, Pipeline processing is stopped temporarily and the NOP code is outputted as the second code according to the switch signal.

In this case, the latched first instruction code is outputted as the second instruction code, the instruction code is output from stall control part after NOP is executed, afterwards the instruction code is executed.

Next, it is preferable that the stall control part further includes the following parts: A first instruction register latches the first instruction code which read out from the instruction code storage part and a first switch part for inputting the first instruction code outputted from the first instruction register and NOP code and for selecting and outputting either the first instruction code or NOP code based on a first switching signal. Also a second instruction register latches the output signal of the first switch part and a second switch part for inputting the output signal outputted from the second instruction register and NOP code and for selecting and outputting either the output signal of the second instruction register or NOP code as a second instruction code based on a second switching signal are included. A temporary pipeline stop part for inputting the output signal which is outputted from the switch part, for detecting whether the inputted signal is an instruction which includes NOP field or not, for controlling output of the stop signal to the address generation part and the first instruction register and another stop signal to the second instruction register based on the detecting result, and for controlling the output of the switching signal to the first switch part and the second switching part is included.

According to the above configuration, the NOP field space assigned in about one instruction can be reduced by assigning the NOP field in both parties of the first instruction code and the second instruction code, executing NOP of the predetermined number after the first instruction code is executed, and executing and performing NOP of the predetermined number before the second instruction code is executed.

When the field space by which the NOP field is assigned in the instruction code is small, the program control apparatus of the present invention is especially effective.

The number of NOP which the bit row in the NOP field shows can not be limited to a binary value, and it is possible to decide the combination of the bit row showing a specific numerical value.

Next, it is preferable that the temporary pipeline stop part includes the following parts: A NOP number counter is for counting the number of the NOP specified in the NOP field assigned in the instruction code and a detection part for detecting the inputted instruction code is an instruction which includes NOP field or not. The detection part outputs the stop signal while specified cycles of pipeline processing stage corresponding to the NOP number which is outputted from the NOP number counter when detection part detects the inputted instruction is an instruction which includes the NOP field.

According to the above configuration, the program control apparatus of the present invention can perform the detection for an inputted instruction whether the specific instruction where the NOP field is assigned or not and the detection for the number of NOP which is set in the NOP field.

These and other advantages of the present invention will become apparent to those skilled in the art upon reading and understanding the following detailed description with reference to the accompanying figures.

BRIEF DESCRIPTION OF THE DRAWINGS

FIG. 2 is a table showing a classified instruction causing resource competition classified by the number of instruction kind and the available field space.

DESCRIPTION OF THE PREFERRED EMBODIMENTS

Hereinafter, the present invention will be described by way of embodiments with reference to the accompanying drawings.

Embodiment

An embodiment of this invention is described below. A basic principle of this invention is described first, and then concrete embodiments of a program control method and an apparatus is described.

First, a basic principle of a method of the program control of this invention is described below.

When the same register is referred to in program processing in a preceding instruction and in a following instruction, resource competition such as register interference, etc., occasionally can occur.

Figure 1:
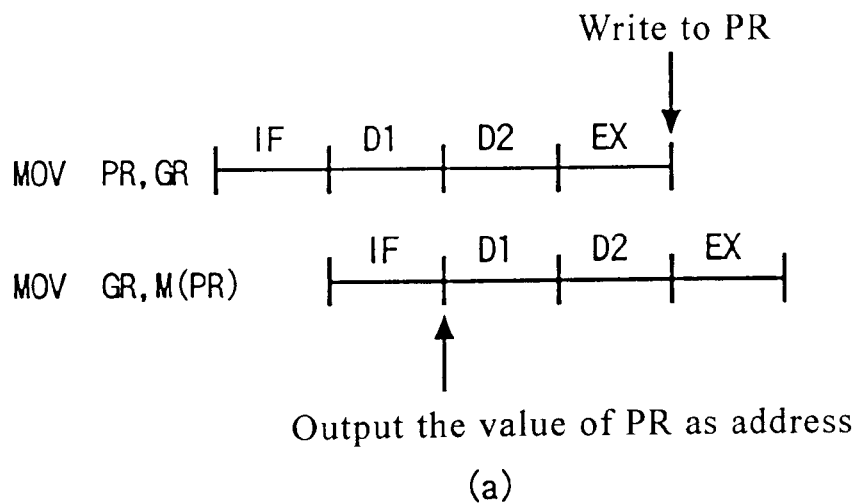
FIG. 1 is a schematic diagram showing a case where the register interference occurs and a principle for preventing the register interference by the NOP insertion.
Figure 1:
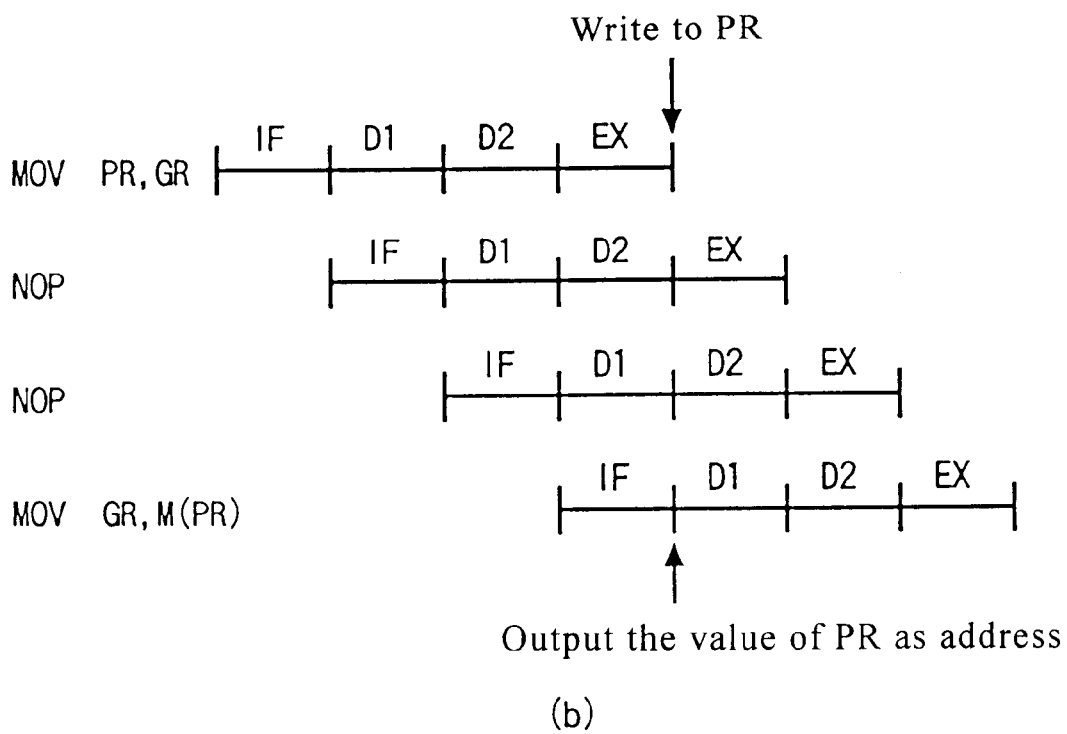

FIG. 1(a) shows one sample of the occurrence of register interference. This timing chart shows the case for four step pipeline, the preceding instruction is data transfer instruction "MOV PR, GR" from GR to PR, the following instruction is move operation "MOV GR, M(PR)" from the data memory to GR addressing by PR value, and both instruction are in series.

In the preceding instruction, the data transfer from GR to PR is performed in the EX stage. On the other hand, in the following instruction, addressing of the data memory of PR is performed in the D1 stage. Therefore, addressing in the following instruction is performed earlier than the data transfer to PR by the preceding instruction, and addressing will be done by the previous value of PR before the data transfer.

In order to avoid and to solve the problem of this register interference, a stall control between a preceding instruction and the following instruction by inserting and performing NOP of a necessary number and timing adjustment of both instruction is necessary.

FIG. 1(b) shows one sample of the solution to avoid the occurrence of the register interference by the NOP insertion. Two NOPs are inserted, and two pipeline processing stages timing of the following instruction are delayed. Therefore, correct addressing can be performed in the following instruction by the use of PR value after the data transfer by the preceding instruction. As the method for specifying and performing the NOP insertion, there is a method for inserting and performing NOP by detecting the resource competition with hardware and a method for inserting the NOP instruction to be included into a program in advance. However, the former method results in an increment of circuit scale, the latter method results in an increment of memory consumption because the number of instructions in programs increases. In this invention, the method for assigning the NOP field in the instruction code and specifying and performing the NOP insertion in the processing is adopted.

There are three methods for assigning the NOP field in this instruction code. The first method is a method for assigning the NOP field into the preceding instruction causing the resource competition, the second method is a method for assigning the NOP field into the following instruction causing the resource competition, the third method is a method for dividing and assigning the NOP field into both the preceding instruction and following instruction. Selection of the method from among the first method to third method depends on the character of the preceding instruction and the following instruction causing the resource competition.

FIG. 2 is a table showing a classified instruction causing the resource competition classified by the number of instruction kind and the available field space.

Figure 3:
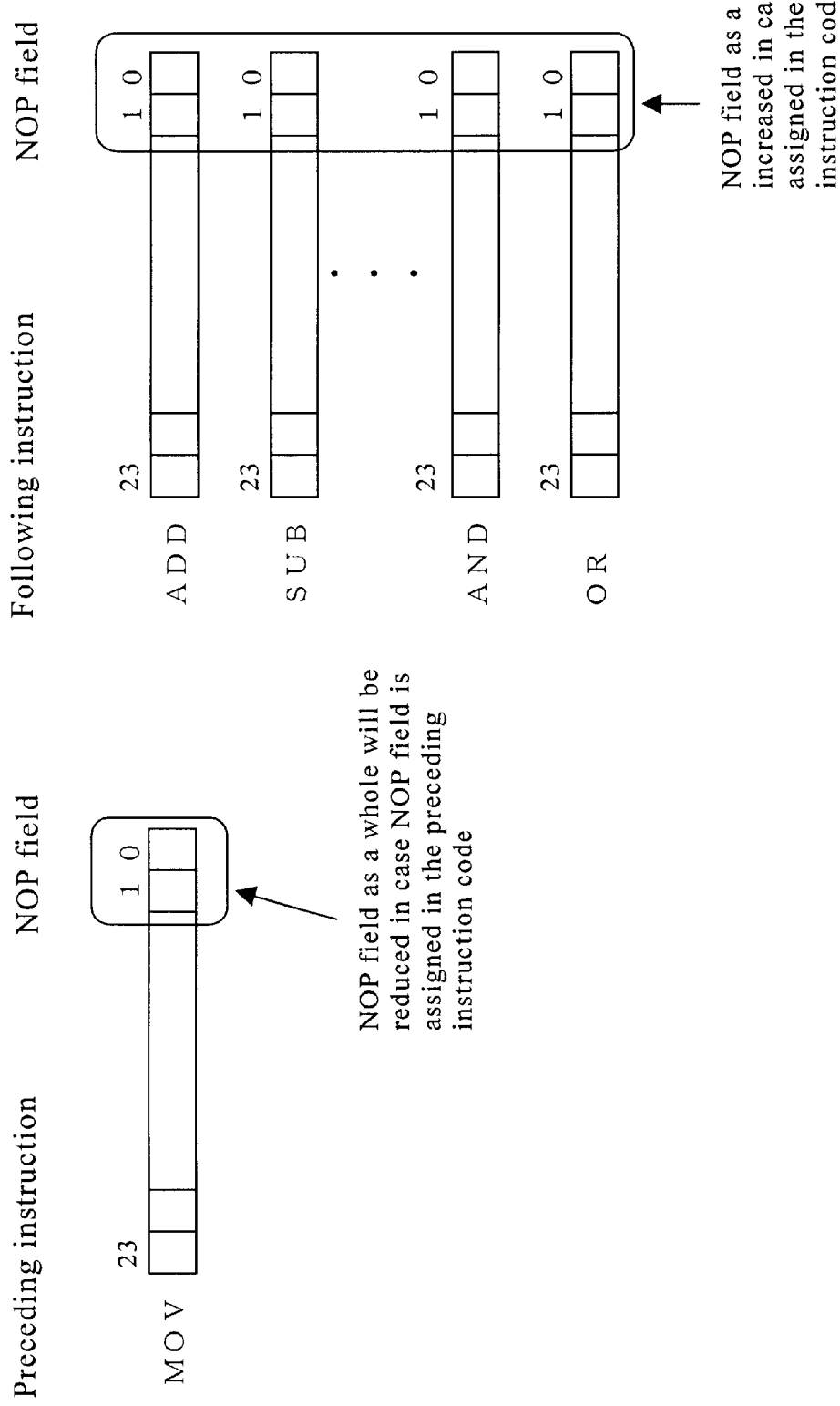
FIG. 3 is a schematic diagram showing a instruction field of a preceding instruction and a following instruction which are classified as type I in the instruction class shown by FIG. 2.

In case of a set of a preceding instruction and a following instruction classified as type I in the instruction class shown by FIG. 2, the first method for assigning the NOP field into the preceding instruction is adopted. The reason for this type is that the number of NOP fields assigned as a whole will be small because the number of the preceding instruction by which the NOP field is assigned is small, on the contrary, there are a lot of following instructions as showing in FIG. 3. Therefore, the number of NOP fields assigned as a whole increases when the NOP field is assigned in the following instruction.

Figure 4:
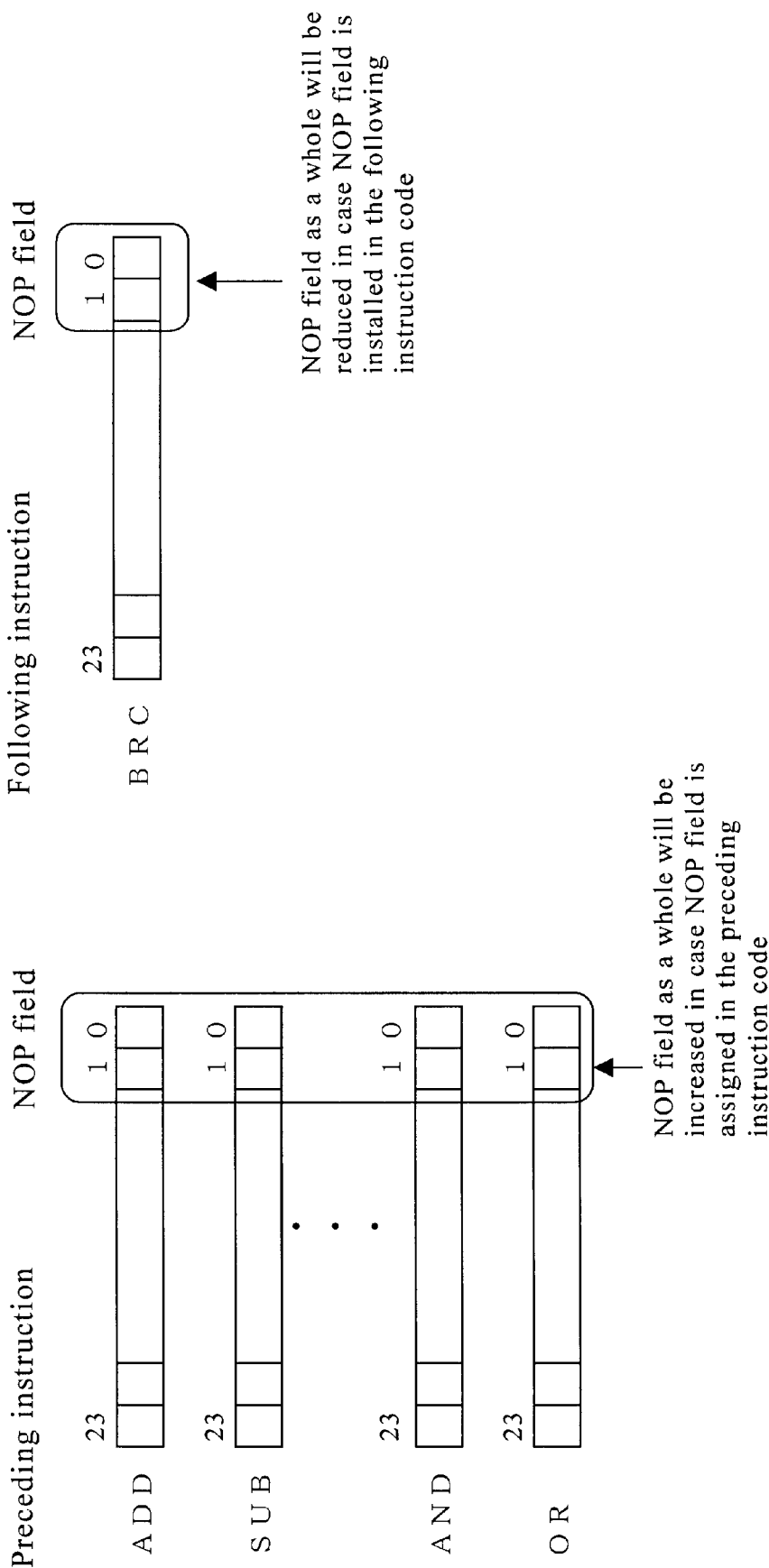
FIG. 4 is a schematic diagram showing a instruction field of a preceding instruction and a following instruction which are classified as type II in the instruction class shown by FIG. 2.

In case of a combination of a preceding instruction and a following instruction classified as type II in the instruction class shown by FIG. 2, the second method for assigning the NOP field into the following instruction is adopted. The reason for this type is that the number of NOP fields assigned as a whole will be small because the number of the following instruction by which the NOP field is assigned is small, on the contrary, there are a lot of preceding instructions shown as in FIG. 4. Therefore, the number of NOP fields assigned as a whole increases when the NOP field is assigned in the preceding instruction.

Figure 5:
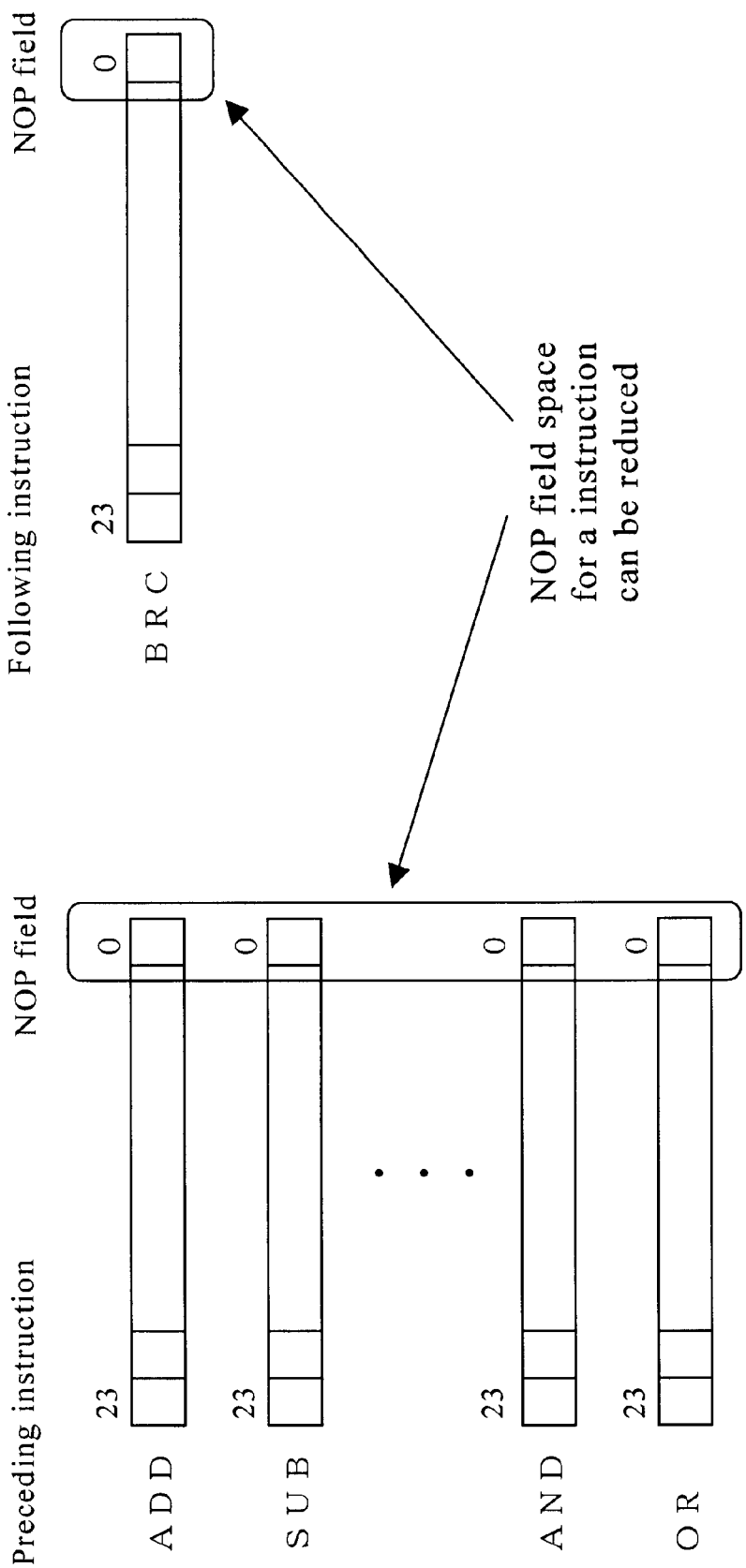
FIG. 5 is a schematic diagram showing a instruction field of a preceding instruction and a following instruction which are classified as type III in the instruction class shown by FIG. 2.

In case of a combination of a preceding instruction and a following instruction classified as type III in the instruction class shown by FIG. 2, the third method for assigning the NOP field into both preceding instruction and the following instruction is adopted. Because, in this type III, there is not enough space for the whole NOP field in one instruction code field in either of the preceding instruction code or the following instruction code. Therefore, the NOP field is divided and assigned into both the preceding instruction and the following instruction in order to specify a necessary NOP number. This principle is shown in FIG. 5.

Instructions MOV and ADD described in FIG. 2 are examples of the preceding instruction and the following instruction.

As shown above, the method for stall control by assigning a NOP field in the instruction code is selected according to the number of the instruction kind and the available field space, and stall control is achieved by the method selected according to a combination of a preceding instruction and a following instruction causing the resource competition in the processing program.

When the kind of the preceding instruction is less than the kind of the following instruction, the combination of the instructions is treated as the type I, the stall control is achieved by assigning the NOP field in the preceding instruction code, and if the specified NOP number is N detected by decoding the preceding instruction code, inserting N piece of NOP into the processing after executing the instruction which corresponds to the preceding instruction code.

When the kind of the following instruction is less than the kind of the preceding instruction, the combination of the instructions is treated as the type II, the stall control is achieved by assigning the NOP field in the following instruction code, and if the specified NOP number is N detected by decoding the following instruction code, inserting N piece of NOP into the processing before executing the instruction which corresponds to the following instruction code.

When there is not enough available field space in an instruction code, the combination of the instructions is treated as the type III, the stall control is achieved by assigning the NOP field in both preceding instruction code and the following instruction code, and if the specified NOP number is N detected by decoding the preceding instruction code, inserting N piece of NOP into the processing after executing the instruction which corresponds to the preceding instruction code, and then, if the specified NOP number is M detected by decoding the following instruction code, inserting M piece of NOP into the processing before executing the instruction which corresponds to the following instruction code.

Next, the basic component of the program control apparatus of this invention is described below.

Figure 6:
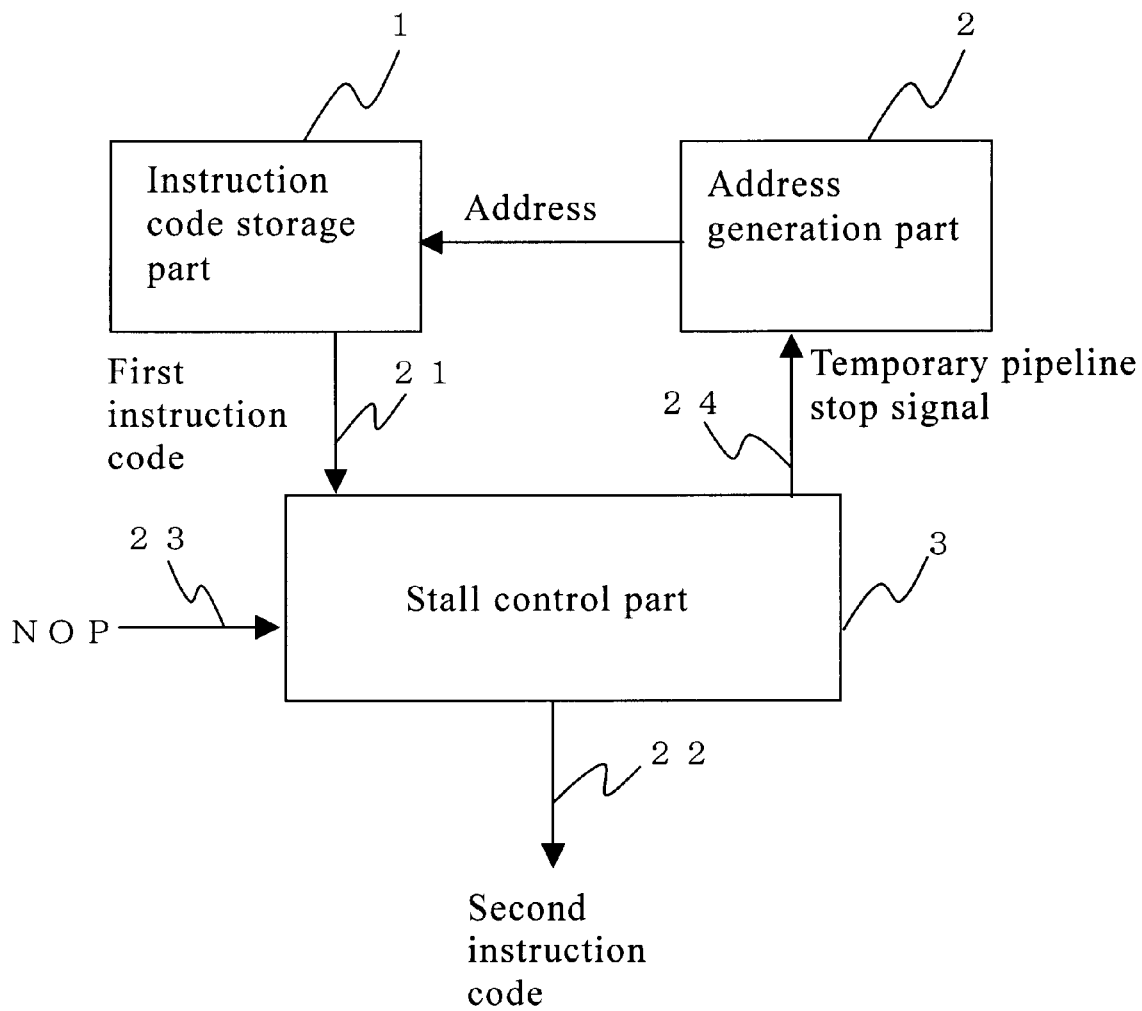
FIG. 6 is a block diagram showing a basic configuration of the program control apparatus of this invention.

FIG. 6 is a block diagram showing the basic components of this invention. As shown in FIG. 6, 1 denotes an instruction code storage part, 2 denotes an address generation part, and 3 denotes stall control part. Instruction code storage part 1 is a memory or the like. where the instruction codes are stored, and the corresponding instruction is outputted to the stall control part 3 as the first instruction code according to the address signal from the address generation part 2. The input signals of stall control part 3 are the first instruction code 21 and NOP code 23. The first instruction code 21 is input, and detection whether this inputted first instruction code has the NOP field or not is performed. If the first instruction code 21 is judged as the instruction code having the NOP field, decoding is performed in order to detect the number of NOP to be inserted, and the control is performed for outputting the temporary pipeline stop signal 24 of specified cycle number temporarily stop temporary the pipeline processing stage to the address generation part 2 and outputting the NOP code 23 as the second instruction code 22.

Next, when the inputted the first instruction code 21 is the code which does not have the NOP field, the temporary pipeline stop signal 24 to the address generation part 2 is not outputted, the first instruction code 21 is outputted as the second instruction code 22. By inputting instructions which have the necessary available space for NOP field to the program control apparatus which includes the basic component described above, avoidance of the resource competition can be achieved by inserting NOP of a necessary number between the instructions causing the resource competition such as the register interference etc.

It is a basic idea of this invention method of the program control and the program control apparatus.

Next, respective program control method and program control apparatus corresponding to the instruction type I to III classified according to FIG. 2 are described in the following Embodiment 1 to Embodiment 3 below.

Embodiment 1

Figure 7:
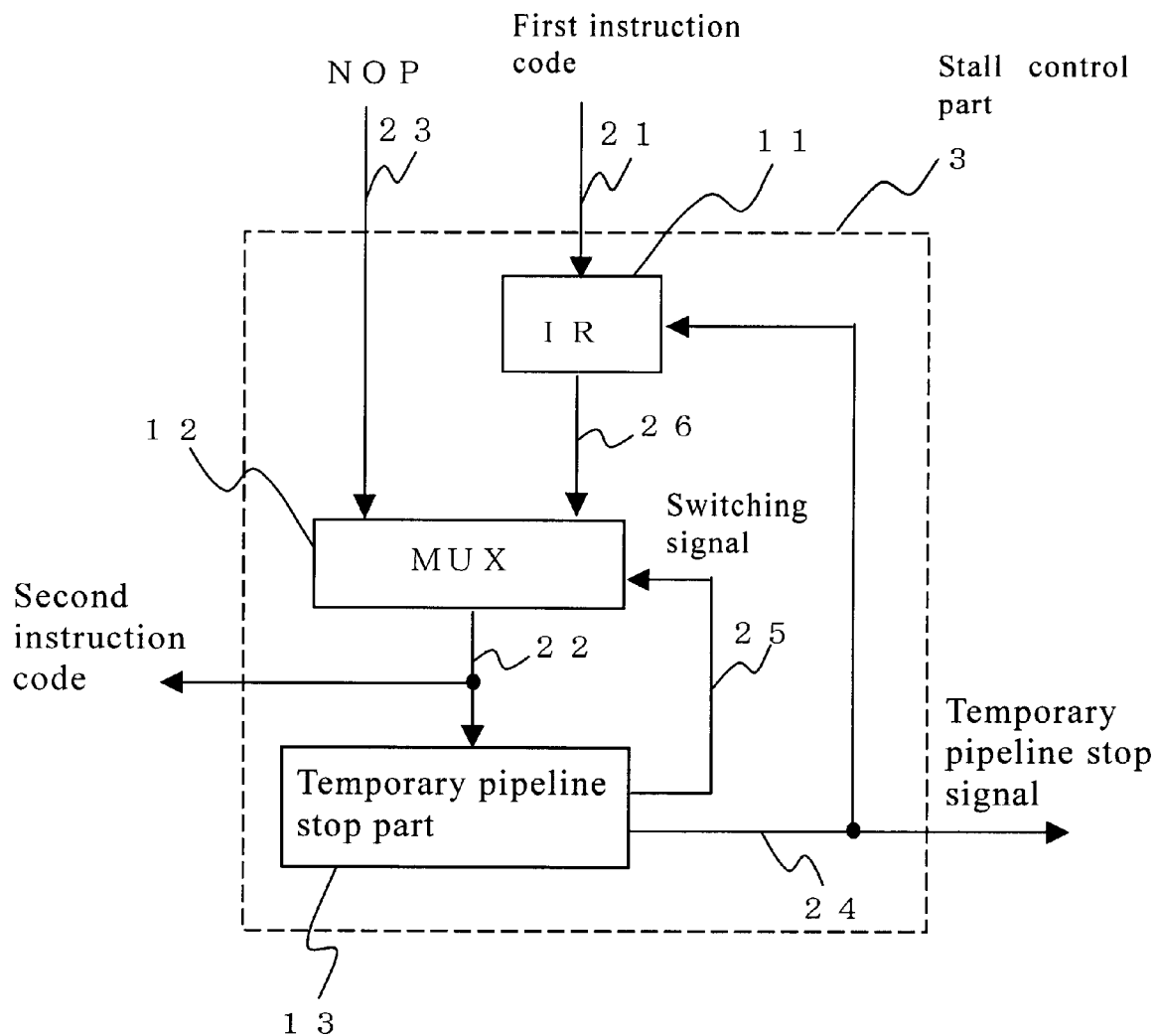
FIG. 7 is a block diagram showing a program control apparatus according to Embodiment 1 of the present invention.

The Embodiment 1 is an example of a program control method and apparatus corresponding to the type I, which the kind of the preceding instruction is less than the kind of the following instruction. In this Embodiment 1, stall control is performed by detecting the NOP field of the inputted preceding instruction code, inserting NOP of the cycle corresponding to the value of N specified in the NOP field after executing of the instruction corresponding to the instruction code. FIG. 7 is a block diagram showing a program control apparatus which centers on stall control part 3 of a Embodiment 1 of this invention. Although not shown, an instruction code storage part 1 and an address generation part 2 is included in the apparatus. For concise description, they are omitted in FIG. 7.

As shown in FIG. 7, 11 denotes a first instruction register as an instruction latch part. An first instruction code 21 is an input signal, a temporary pipeline stop signal 24 is a control signal input, and the latch signal 26 is an output signal. 12 denotes a multiplexer as a switch part. An NOP code 23 and an output of the first instruction register 11 are input signals, a switch signal 25 is a control signal input, and the second instruction code 22 is an output signal. 13 denotes a temporary pipeline stop part. A second instruction code 22 is input signal, a switch signal 25 and a temporary pipeline stop signal 24 are output signals.

Figure 10:
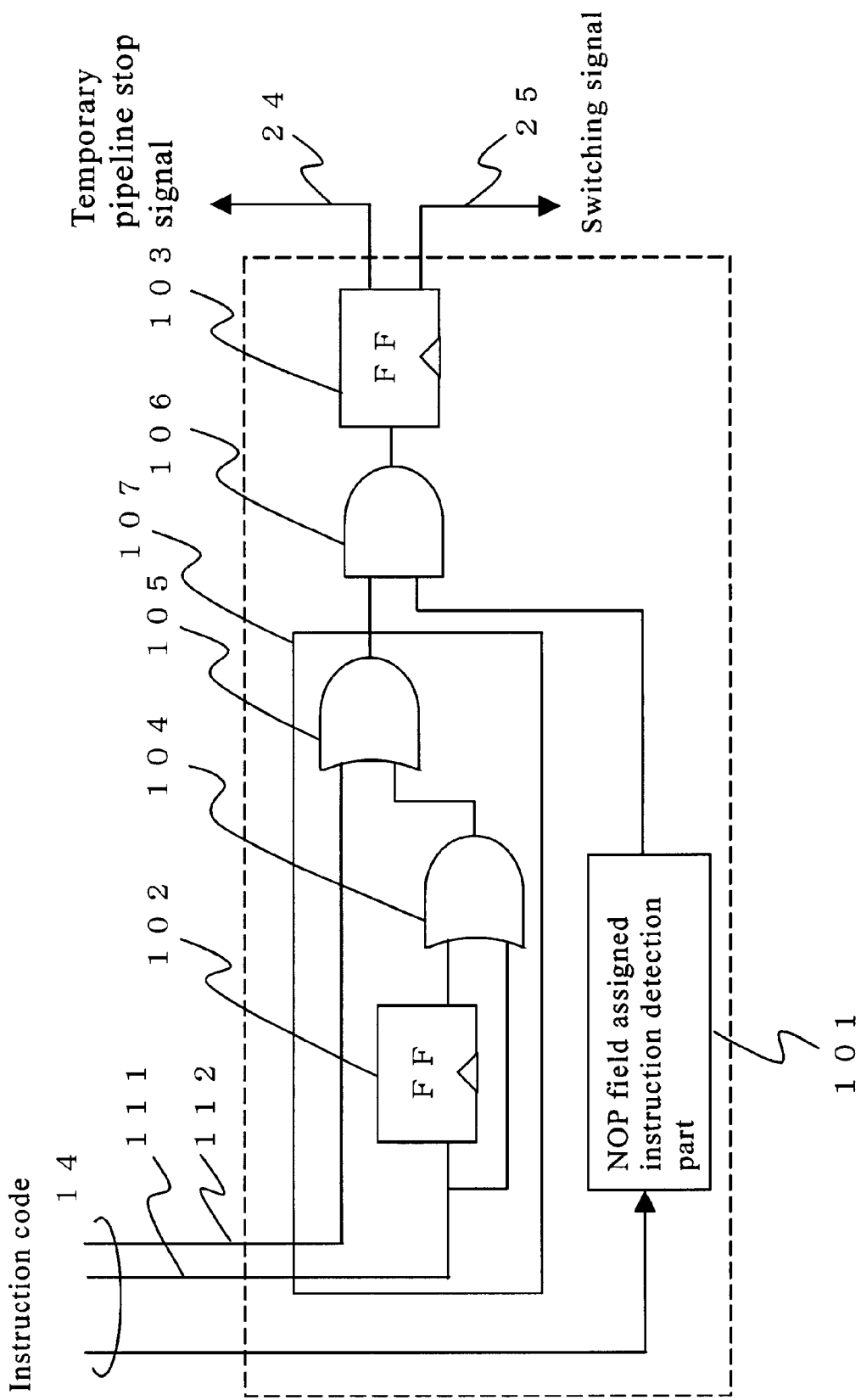
FIG. 10 is a detailed circuit structure diagram showing a temporary pipeline stop part 13 in the program control apparatus of FIG. 7 to FIG. 8.

FIG. 10 showing an example detailed circuit structure diagram for a temporary pipeline stop part 13 when NOP field has 2 bits of space. In FIG. 10, 101 denotes a NOP field assigned instruction detection part. The first instruction code 21 (instruction code other than the NOP field can be used) is an input signal and can detect whether inputted instruction code has the NOP field or not.

As shown in FIG. 7 in this Embodiment 1, the second instruction code 22 is inputted. In FIG. 10, the first instruction code 21 is selected and inputted by multiplexer 12 as the second instruction code 22.

NOP field assigned instruction detection part 101 outputs logic "1" when the first instruction code 21 is an instruction with the NOP field and outputs logic "0" when the first instruction code 21 is an instruction without the NOP field. The 102 and the 103 are flip-flops (hereinafter referring to as FF), the 104 and the 105 are OR gates (logical add), the 106 is AND (logical product) gate. NOP number count part 107 is formed with flip-flop 102 and OR gates 104 and 105. When the instruction code has adopted LSB, the NOP field is assumed to be a lower two bits in an instruction code, and signal 111 is a lower bit of 2 bits of the NOP fields, and signal 112 is a upper bit of 2 bits of the NOP fields. The input signal of FF 102 is signal 112. The input signal of FF 103 is an output of AND gate 106, and the output signals of FF 103 is a switch signal 15 and a temporary pipeline stop signal 24. The input signal of the OR gate 104 is output from the FF 102 and signal 112. The input of OP gate 105 is signal 111 and an output signal from the OR gate 104. The input signals of AND gate 106 are an output signal from the OR gate 105 and an output signal from NOP field assigned instruction detection part 101. When the first instruction code 21 is an instruction with the NOP field, the temporary pipeline stop part 13 by this circuit structure outputs a switch signal 25 and a temporary pipeline stop signal 24 for the processing stage corresponding to the specified number of NOP.

Figure 12:
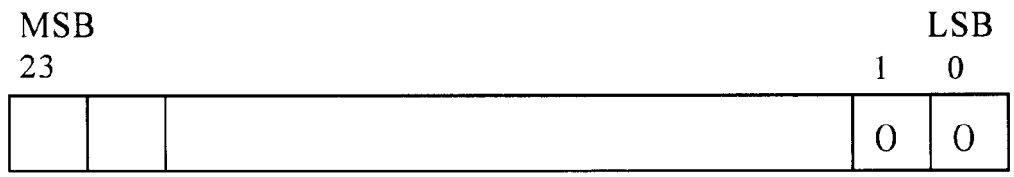
FIG. 12 is an instruction field diagram showing an instruction code according to Embodiment 1 and Embodiment 2 of the present invention.
Figure 12:
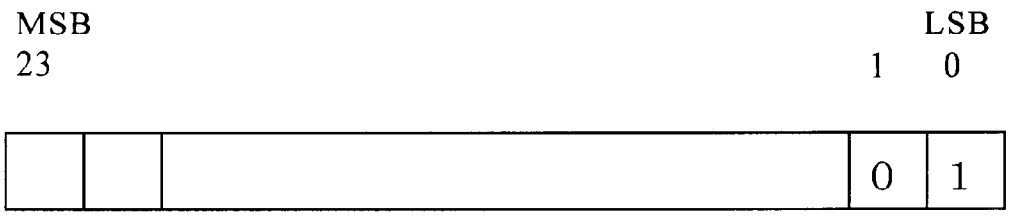
Figure 12:
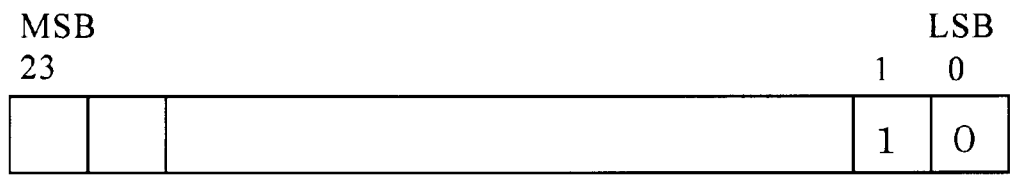
Figure 14:
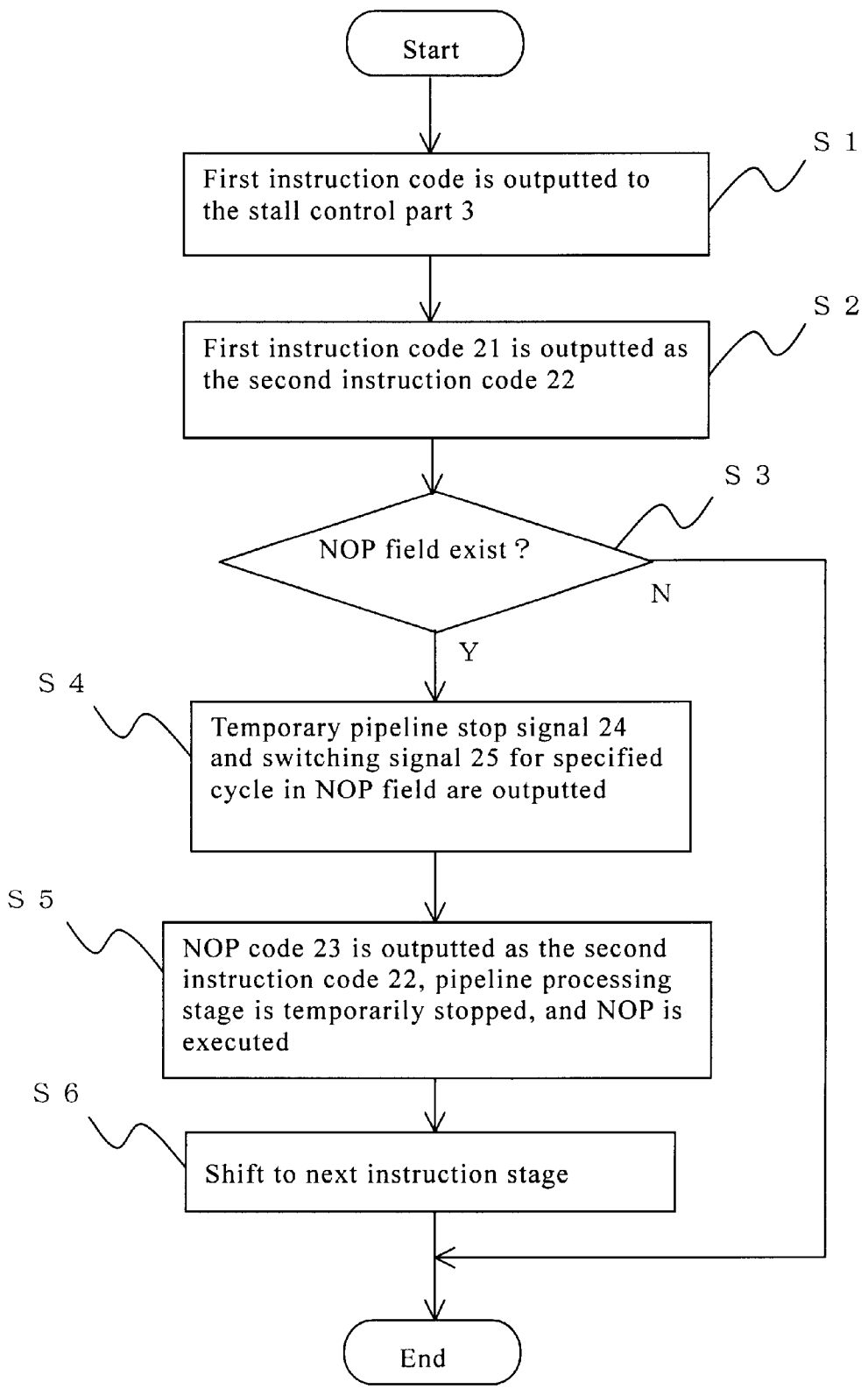
FIG. 14 is a flow chart showing an outline of the processing flow of a program control apparatus according to Embodiment 1 of the present invention.
Figure 15:
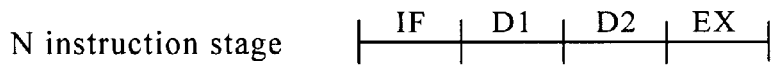
FIG. 15 is a timing chart showing a program control apparatus for four step pipeline according to Embodiment 1 of the present invention.
Figure 15:
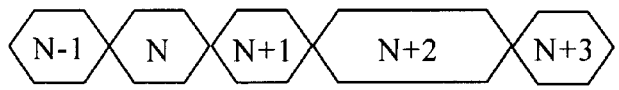
Figure 15:
Figure 15:
Figure 15:
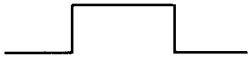
Figure 15:
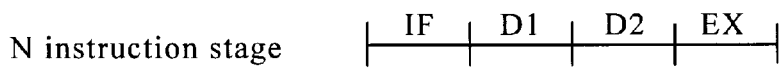
Figure 15:
Figure 15:
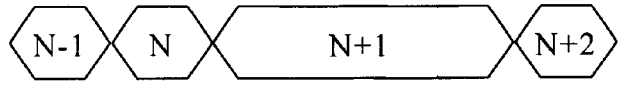
Figure 15:
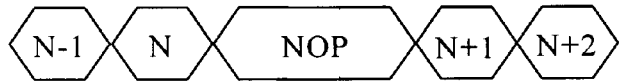
Figure 15:

The operation of the program control apparatus shown above is described based on FIG. 6, FIG. 7, FIG. 10, FIG. 12, and FIGS. 14–15. FIG. 12 shows the bit field of the preceding instruction code where the NOP field is assigned. Bit 0 and bit 1 are NOP fields. NOP number N=1 is directed when bit 0 is "1", and NOP number N=2 is directed when bit 1 is "1". FIG. 14 is a flow chart showing the outline of the processing flow of the program control apparatus of this Embodiment 1. FIG. 15 is a timing chart for a four step pipeline. The move operation (MOV PR,GR) is described as an example of the instruction.

The operation of this apparatus is described by the following steps:

(1) Step 1

The address which the program counter in the address generation part 2 maintains is outputted to the instruction code storage part 1. The instruction code storage part 1 reads out the first instruction code 21 and outputs to the stall control part 3 corresponding to the inputted address.

(2) Step 2 and Step 3

In the stall control part 3, the first instruction register 11 latches the first instruction code 21, the multiplexer 12 selects the output 26 of the first instruction register 11, and outputs as the second instruction code 22. The temporary pipeline stop part 13 outputs signal 22, and detects the instruction code where the NOP field is assigned or not by NOP field assigned instruction detection part 101.

(3) Step 4

When the signal 111, which is the lower bit of the NOP field, is "1" (as shown by FIG. 15 (a)), the temporary pipeline stop part 13 outputs one cycle of the temporary pipeline stop signal 24 and the switch signal 25. When the signal 112 which is the upper bit of the NOP field is "1" (as shown by FIG. 15 (b)), the temporary pipeline stop part 13 outputs two cycles of the temporary pipeline stop signal 24 and the switch signal 25.

(4) Step 5

The multiplexer 12 selects NOP code 23 according to switch signal 25, and outputs NOP code 23 as the second instruction code 22, the program counter maintains the address continuously, the first instruction register 11 latches the first instruction code 21.

(5) Step 6

The process shifts to the next instruction processing stage. As shown above, it is possible for the program control apparatus in this Embodiment 1 to perform the temporary stop the pipeline processing stage according to the judgment result whether there is NOP field in the input preceding instruction code, and the stall control can be achieved. In short, the pipeline processing of the following instruction will be stopped temporarily according to the NOP field of the inputted preceding instruction, and the resource competition, such as register interference etc., is avoided.

Embodiment 2

The Embodiment 2 is an example of a program control method and apparatus corresponding to the type II, which the kind of the following instruction is less than the kind of the preceding instruction. In this Embodiment 2, stall control is performed by detecting the NOP field of the inputted following instruction code which follows after the preceding instruction, inserting NOP of the cycle corresponding to the value of N specified in the NOP field, and executing the following instruction corresponding to the instruction code.

Figure 8:
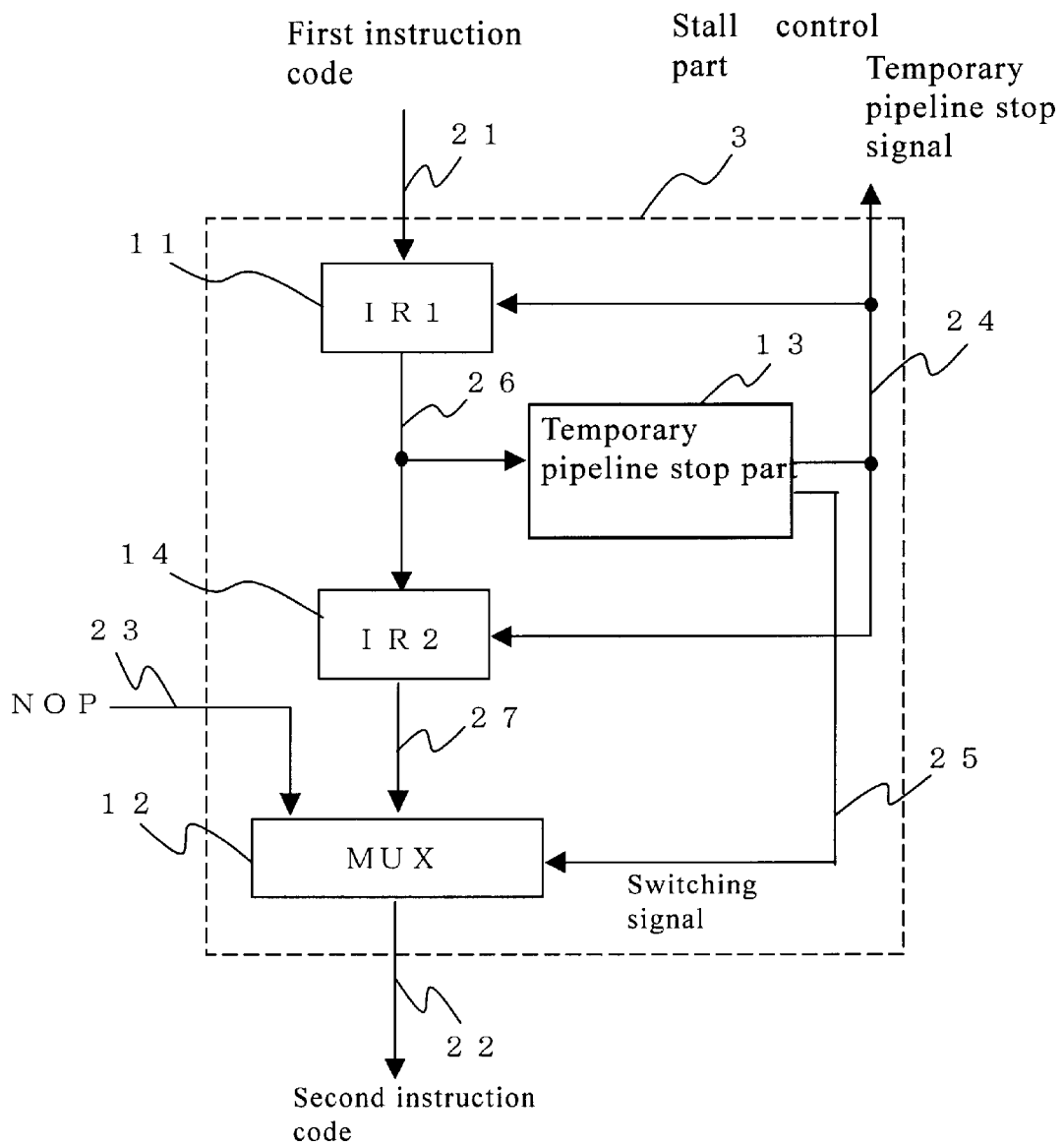
FIG. 8 is a block diagram showing a program control apparatus according to Embodiment 2 of the present invention.

FIG. 8 is a block diagram showing a program control apparatus which centers on stall control part 3 of an Embodiment 2 of this invention. Although not shown, an instruction code storage part 1 and an address generation part 2 are included in the apparatus. For concise description, they are omitted in FIG. 8.

As shown in FIG. 8, 11 denotes a first instruction register as an instruction latch part. An first instruction code 21 is an input signal, a temporary pipeline stop signal 24 is a control signal input, and the latch signal 26 is an output signal. 13 denotes a temporary pipeline stop part. An output signal 26 of the first instruction register is an input signal, a switch signal 25 and a temporary pipeline stop signal 24 are output signals. 14 denotes a second instruction register as a second instruction latch part. A latched output signal 26 from the first instruction register is an input signal, a temporary pipeline stop signal 24 is a control signal input, and the latch signal 27 is an output signal. 12 denotes a multiplexer as a switch part. An NOP code 23, an output 27 of the second instruction register 14 are input signals, a switch signal 25 is a control signal input, and the second instruction code 22 is an output signal.

Figure 16:
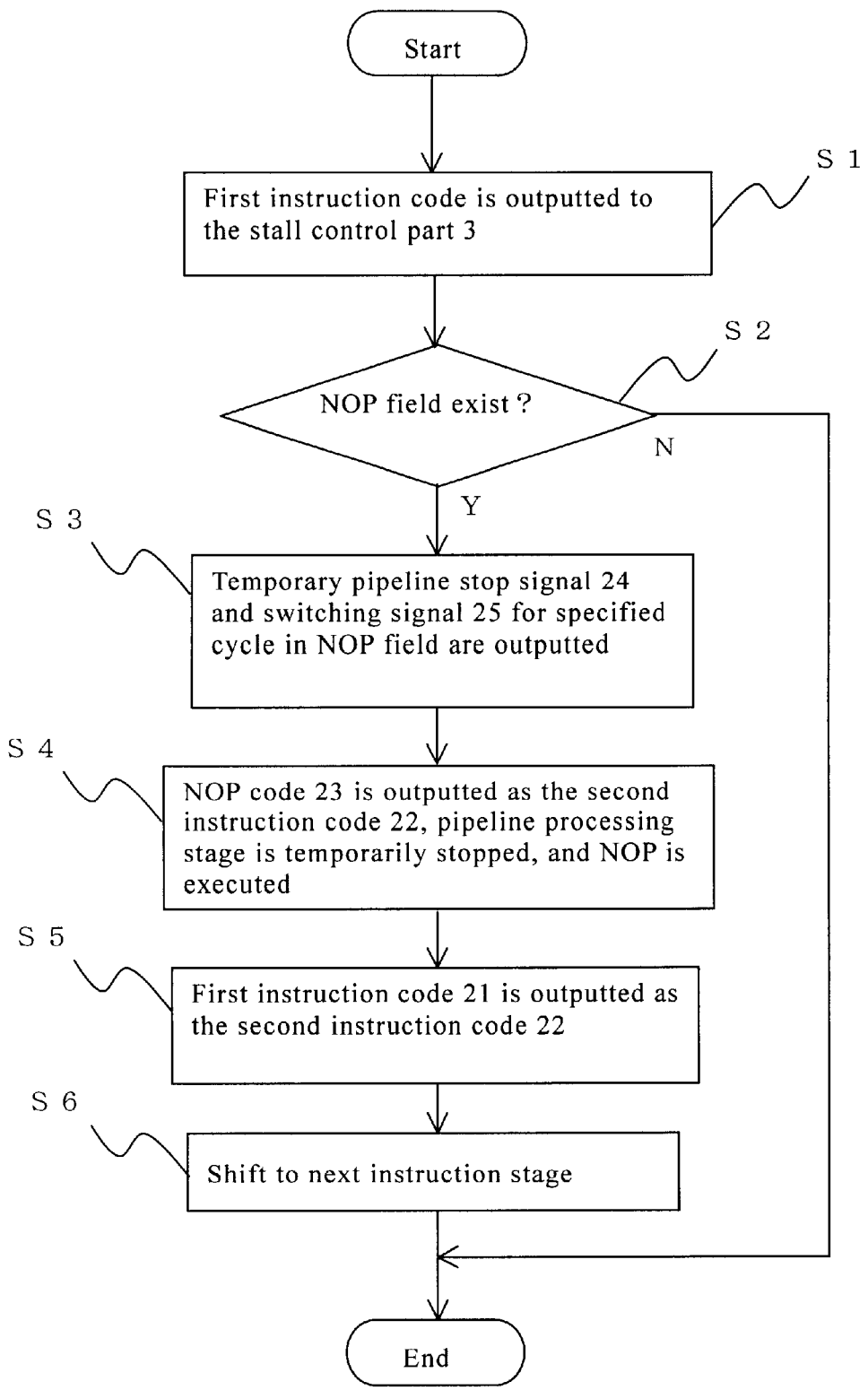
FIG. 16 is a flow chart showing an outline of the processing flow of a program control apparatus according to Embodiment 2 of the present invention.
Figure 17:
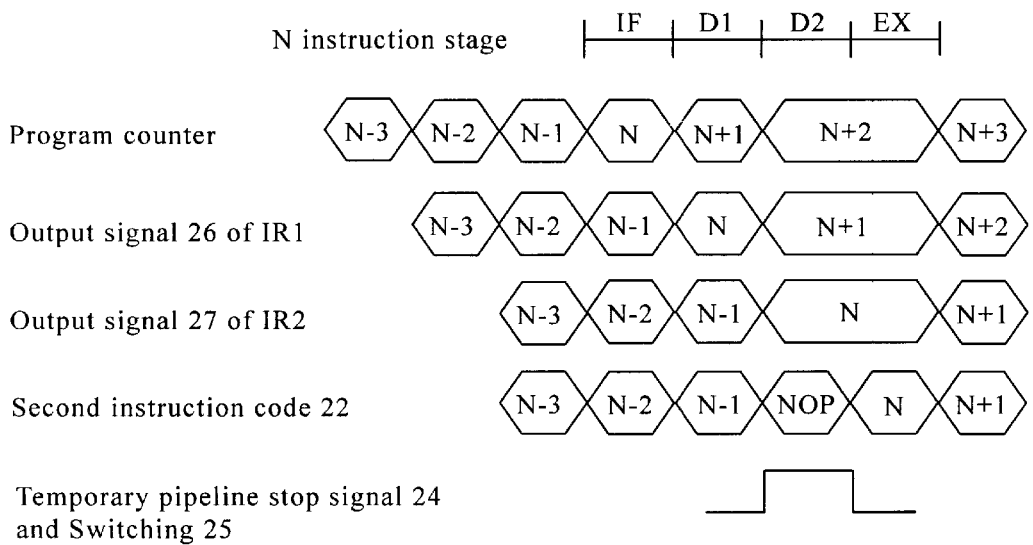
FIG. 17 is a timing chart showing a program control apparatus for four step pipeline according to Embodiment 2 of the present invention.
Figure 17:
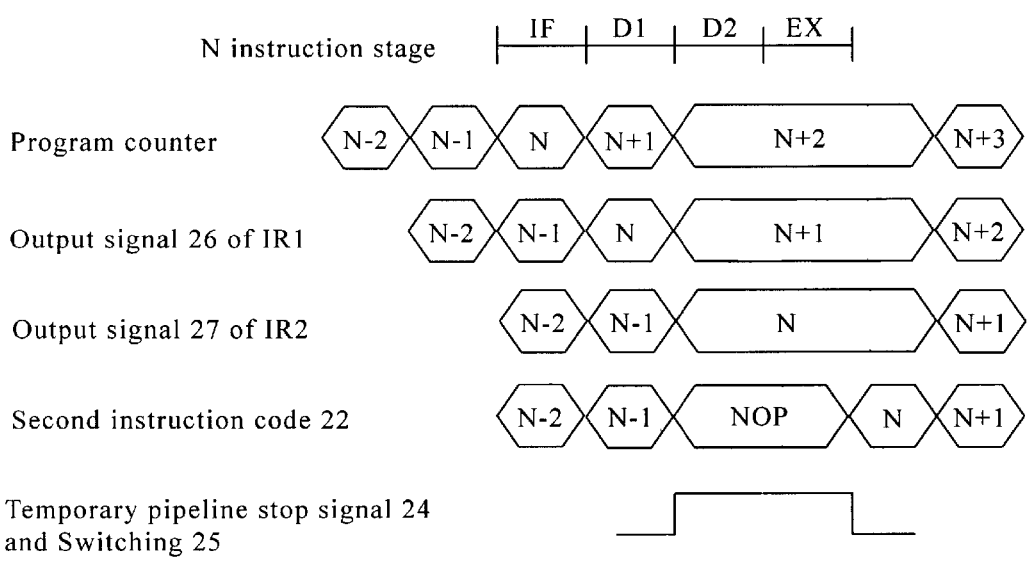

As shown in FIG. 8, the same number is assigned to components having the same function as FIG. 7. The example of the circuit structure of the temporary pipeline stop part 13 is the same circuit structure as shown by FIG. 10 in Embodiment 1. In this Embodiment 2, the temporary pipeline stop part 13 inputs the output signal 26 of the first instruction register, which signal is the latched signal from the first instruction code 21, when the inputted signal is an instruction with NOP field, the temporary pipeline stop part 13 outputs a switch signal 25 and a temporary pipeline stop signal 24 are output signals. The operation of the program control apparatus shown above is described based on FIG. 6, FIG. 8, FIG. 10, FIG. 12, and FIGS. 16–17. The bit field of the following instruction code for which the stall control is applied is the same bit field used in the Embodiment 1 as shown FIG. 12. NOP number N=1 is directed when bit 0 is "1", and NOP number N=2 is directed when bit 1 is "1". FIG. 16 is a flow chart showing the outline of the processing flow of the program control apparatus of this Embodiment 2. FIG. 17 is a timing chart for a four step pipeline. The branch operation (BRC Z, JMP) is described as an example of the following instruction.

The operation of this apparatus is described by the following steps:

(1) Step 1

The address which the program counter in the address generation part 2 maintains is outputted to the instruction code storage part 1. The instruction code storage part 1 reads out the first instruction code 21 and outputs to the stall control part 3 corresponding to the inputted address.

(2) Step 2

In the stall control part 3, the first instruction register 11 latches the first instruction code 21, outputs the output signal 26 of the first instruction register 11. The latched signal 26 is inputted to the temporary pipeline stop part 13 and the second instruction register 14. Latched output signal 26 is inputted to the temporary pipeline stop part 13, the instruction code where the NOP field is assigned is detected by the NOP field assigned instruction detection part 101.

(3) Step 3

When the signal 111, which is the lower bit of the NOP field, is "1"(as shown by FIG. 17 (*a*)), the temporary pipeline stop part 13 outputs one cycle of the temporary pipeline stop signal 24 and the switch signal 25. When the signal 112, which is the upper bit of the NOP field, is "1" (as shown by FIG. 17 (*b*)), the temporary pipeline stop part 13 outputs two cycles of the temporary pipeline stop signal 24 and the switch signal 25.

(4) Step 4

The multiplexer 12 selects NOP code 23 according to switch signal 25, and outputs NOP code 23 as the second instruction code 22, the program counter maintains the address continuously, the first instruction register 11 latches the first instruction code 21 and the second instruction register 14 latches the output signal 27 (the same signal as the first instruction code 21).

(5) Step 5

The switch signal 25 reverses, the multiplexer 12 selects the output signal 27 of the second instruction register 14 and outputs it as the second instruction code 22.

(6) Step 6

The process shifts to the next instruction processing stage. As shown above, it is possible for the program control apparatus in this Embodiment 2 to perform the temporary stop the pipeline processing stage according to the judgment result whether there is NOP field in the input following instruction code, and the stall control can be achieved.

In short, the pipeline processing of the following instruction will be stopped temporarily according to the NOP field of the inputted following instruction, and the resource competition such as register interference etc., is avoided.

Embodiment 3

The Embodiment 3 is an example of a program control method and apparatus corresponding to the type III, when there is not enough available field space in an instruction code. The stall control is performed by detecting the NOP field of the inputted preceding instruction code and inserting NOP of the cycle corresponding to the value of N specified in the NOP field after executing the preceding instruction corresponding to the instruction code. Further, the stall control is performed by detecting the NOP field of the inputted following instruction code, inserting NOP of the cycle corresponding to the value of N specified in the NOP field, before executing the following instruction corresponding to the instruction code.

Figure 9:
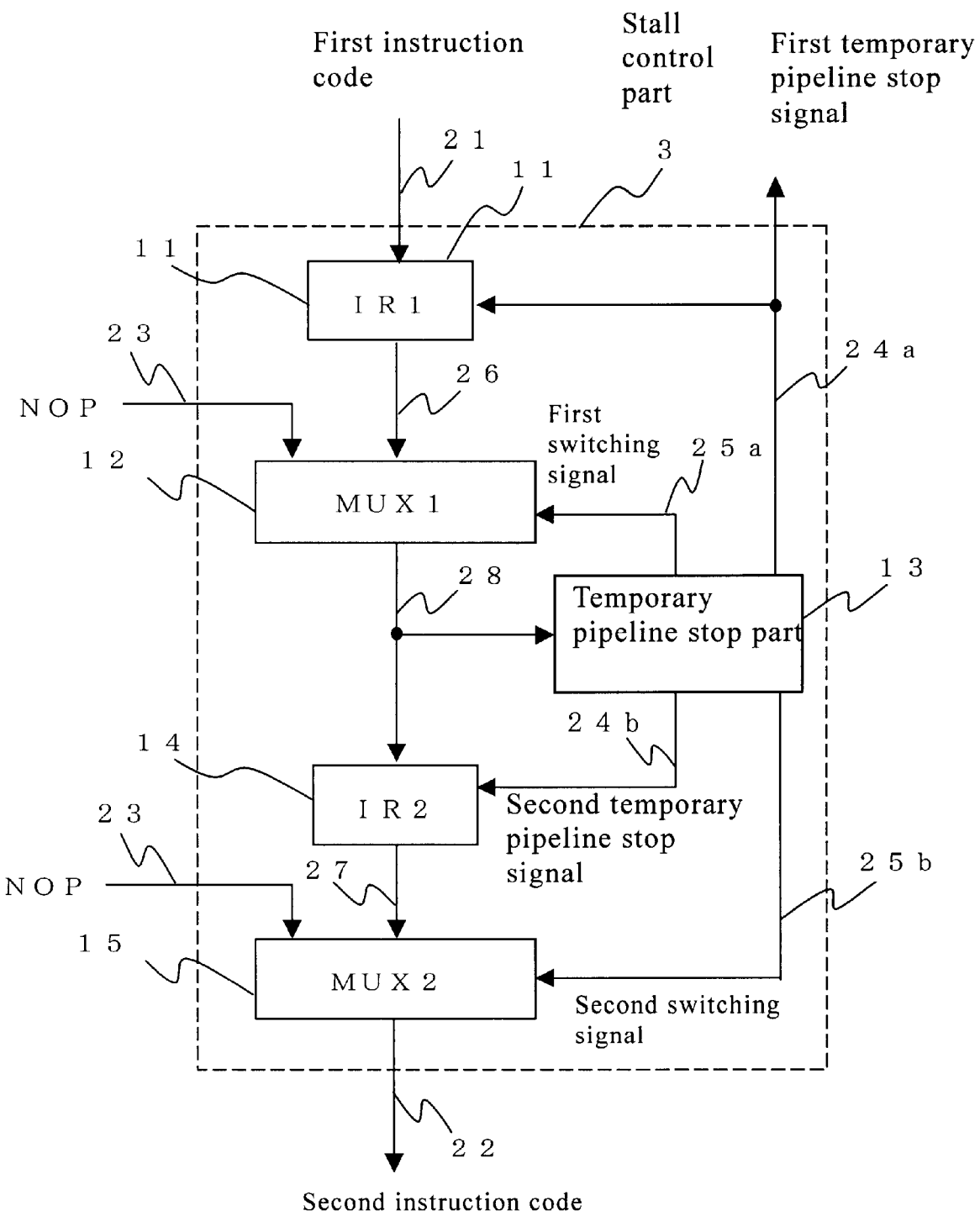
FIG. 9 is a block diagram showing a program control apparatus according to Embodiment 3 of the present invention.

FIG. 9 is a block diagram showing a program control apparatus which centers on stall control part 3 of a Embodiment 3 of this invention. Although not shown, an instruction code storage part 1 and an address generation part 2 are included in the apparatus. For concise description, they are omitted in FIG. 9.

As shown in FIG. 9, 11 denotes a first instruction register as an instruction latch part. An first instruction code 21 is an input signal, a temporary pipeline stop signal 24*a* is a control signal input, and the latch signal 26 is an output signal. 12 denotes a first multiplexer as a first switch part. An NOP code 23 and an output signal 26 of the first instruction register 11 are input signals, a first switch signal 25*a* is a control signal input, and a first selection signal 28 is an output signal. 13 denotes a temporary pipeline stop part. An output signal 26 of the first instruction register is an input signal, a first temporary pipeline stop signal 24*a*, a second temporary pipeline stop signal 24*b*, and a first switch signal 25*a* and a second switch signal 25*b* are output signals. 14 denotes a second instruction register as a second instruction latch part. A latched output signal 26 from the first instruction register is an input signal, a temporary pipeline stop signal 24*b* is a control signal input, and the latch signal 27 is an output signal. 15 denotes a second multiplexer as a second switch part. An NOP code 23 and an latched output signal 27 of the second instruction register 14 are input signals, a second switch signal 25*b* is a control signal input, and a second instruction code 22 is an output signal.

Figure 11:
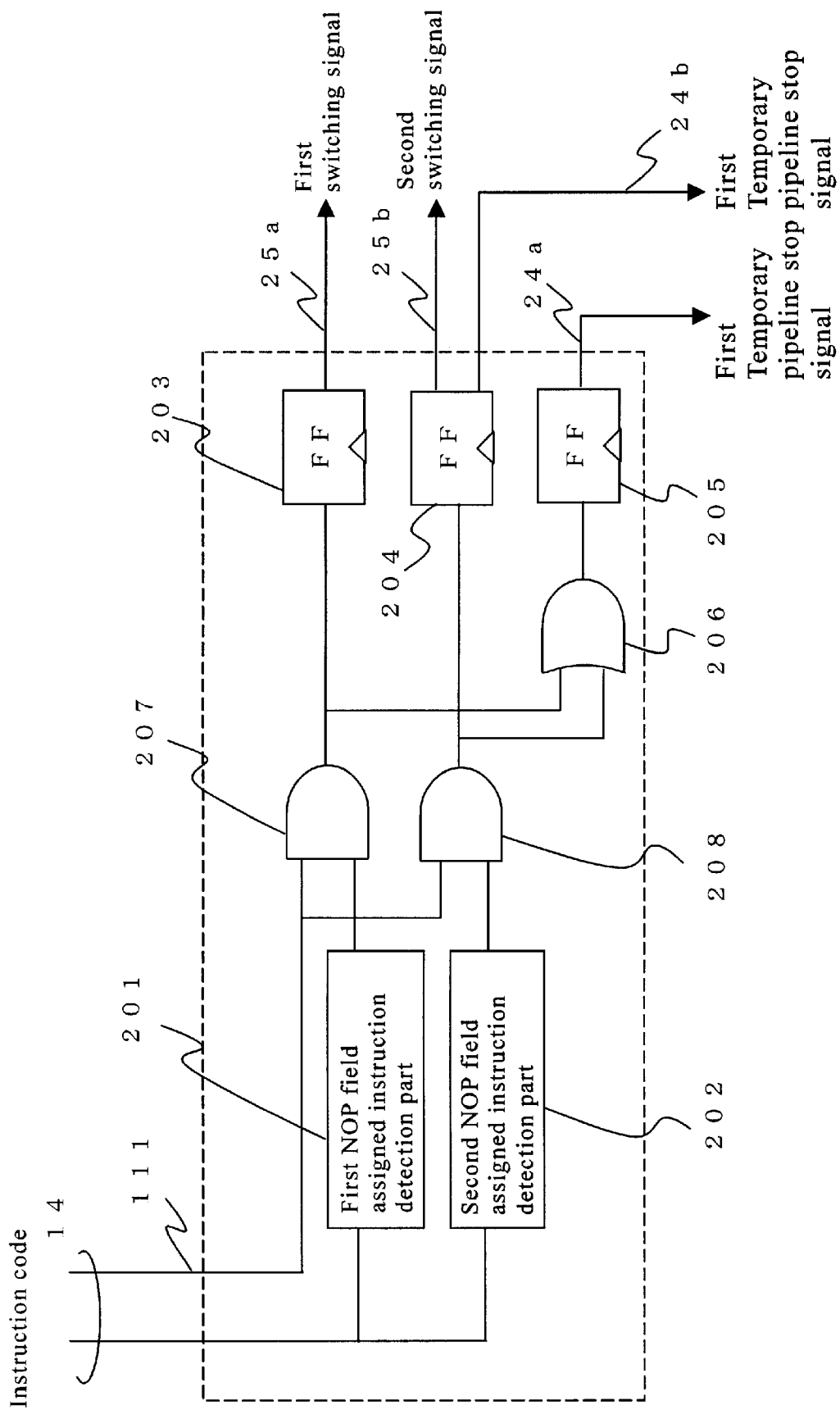
FIG. 11 is a detailed circuit structure diagram showing a temporary pipeline stop part 13 in the program control apparatus of FIG. 9.

In FIG. 9, the same number is assigned to components having the same function as FIG. 7 and FIG. 8. The example of the circuit structure of the temporary pipeline stop part 13 is shown by FIG. 11.

It is necessary to detect a preceding instruction with NOP field and the following instruction with NOP field respectively in this Embodiment 3. It is also necessary to output "Temporary pipeline stop signal" and "Switch signal" separately. In FIG. 11, 201 denotes a first NOP field assigned instruction detection part. 202 denotes a second NOP field assigned instruction detection part. Both 201 and 202 input a first instruction code 21 (instruction code other than the NOP field can be used) and can detect whether inputted instruction code has the NOP field or not. The 203 to the 205 are FF, the 207 and the 208 are AND gates (logical product), the 206 is an OR (logical product) gate. When the instruction code has adopted LSB, the NOP field is assumed to be a lowest bit in a instruction code, and signal 111 is a lowest bit of the NOP fields. The FF 203 outputs a first switch signal 25*a*, the FF 204 outputs a second switch signal 25*b* and a second temporary pipeline stop signal 24*b*, the FF 205 outputs a first temporary pipeline stop signal 24*a*.

In this Embodiment 3, when the preceding instruction with the NOP field is inputted as a first instruction code 21, the temporary pipeline stop part 13 by this circuit structure outputs a first temporary pipeline stop signal 24*a* for the processing stage and a first switch signal 25*a* corresponding to the specified number of NOP.

Next, when the following instruction with the NOP field is inputted as a first instruction code 21, the temporary pipeline stop part 13 by this circuit structure outputs a first temporary pipeline stop signal 24*a* and a second temporary pipeline stop signal 24*b* for the processing stage and a second switch signal 25*b* corresponding to the specified number of NOP. The operation of the program control apparatus shown above is described based on FIG. 6, FIG. 9, FIG. 11, FIG. 13, and FIGS. 18–19.

Figure 13:
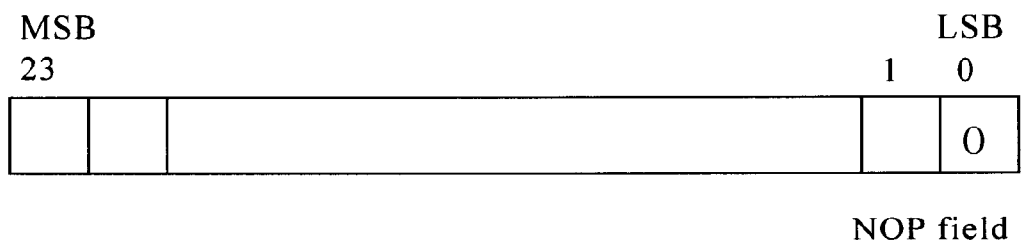
FIG. 13 is an instruction field diagram showing an instruction code according to Embodiment 3 of the present invention.
Figure 13:
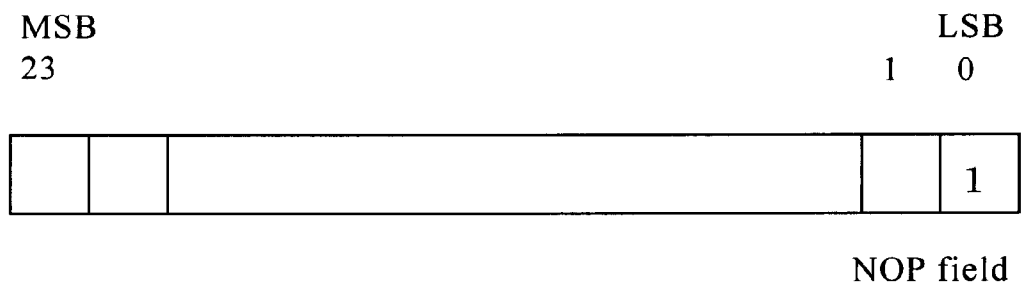
Figure 18:
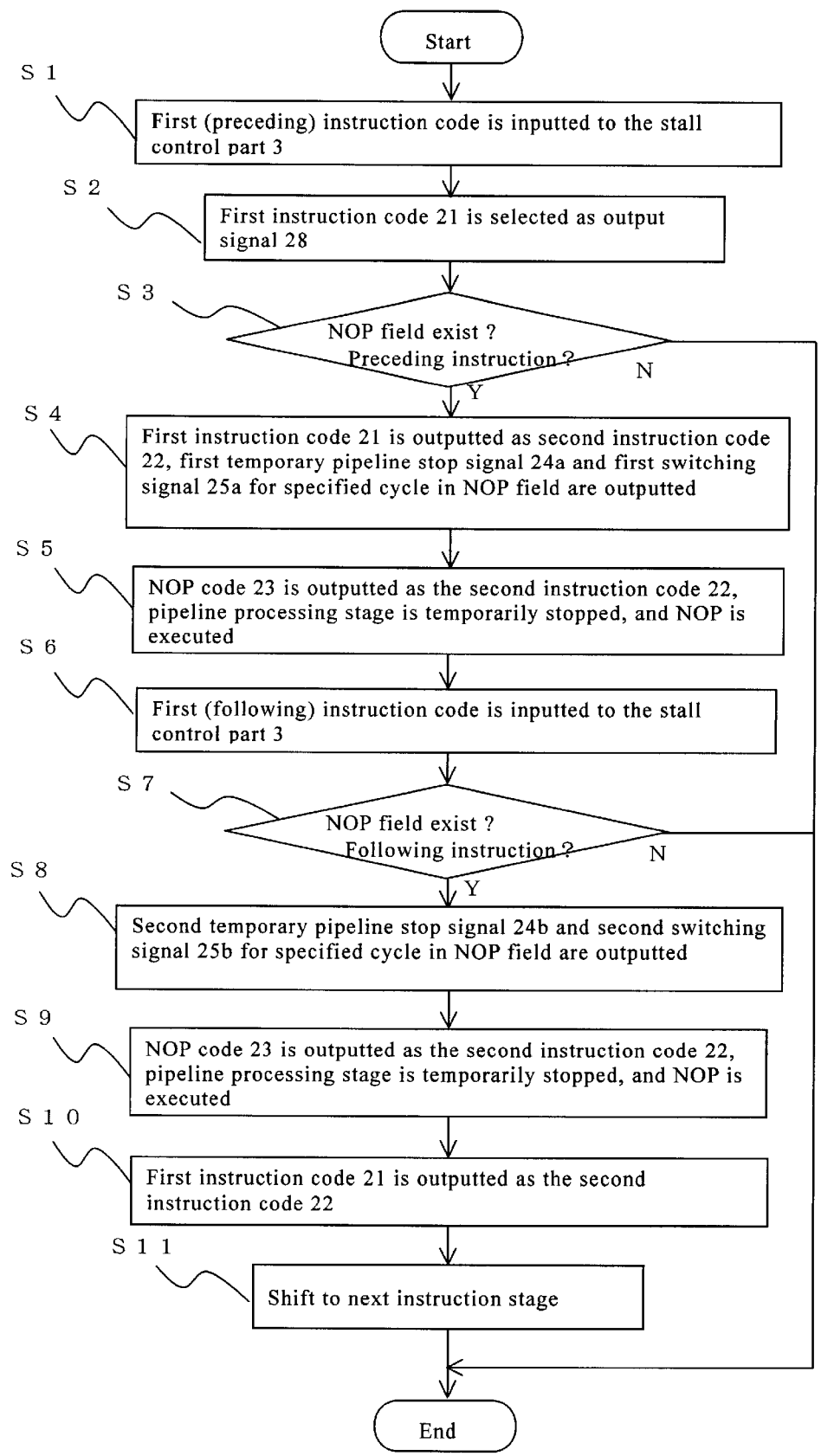
FIG. 18 is a flow chart showing an outline of the processing flow of a program control apparatus according to Embodiment 3 of the present invention.
Figure 19:
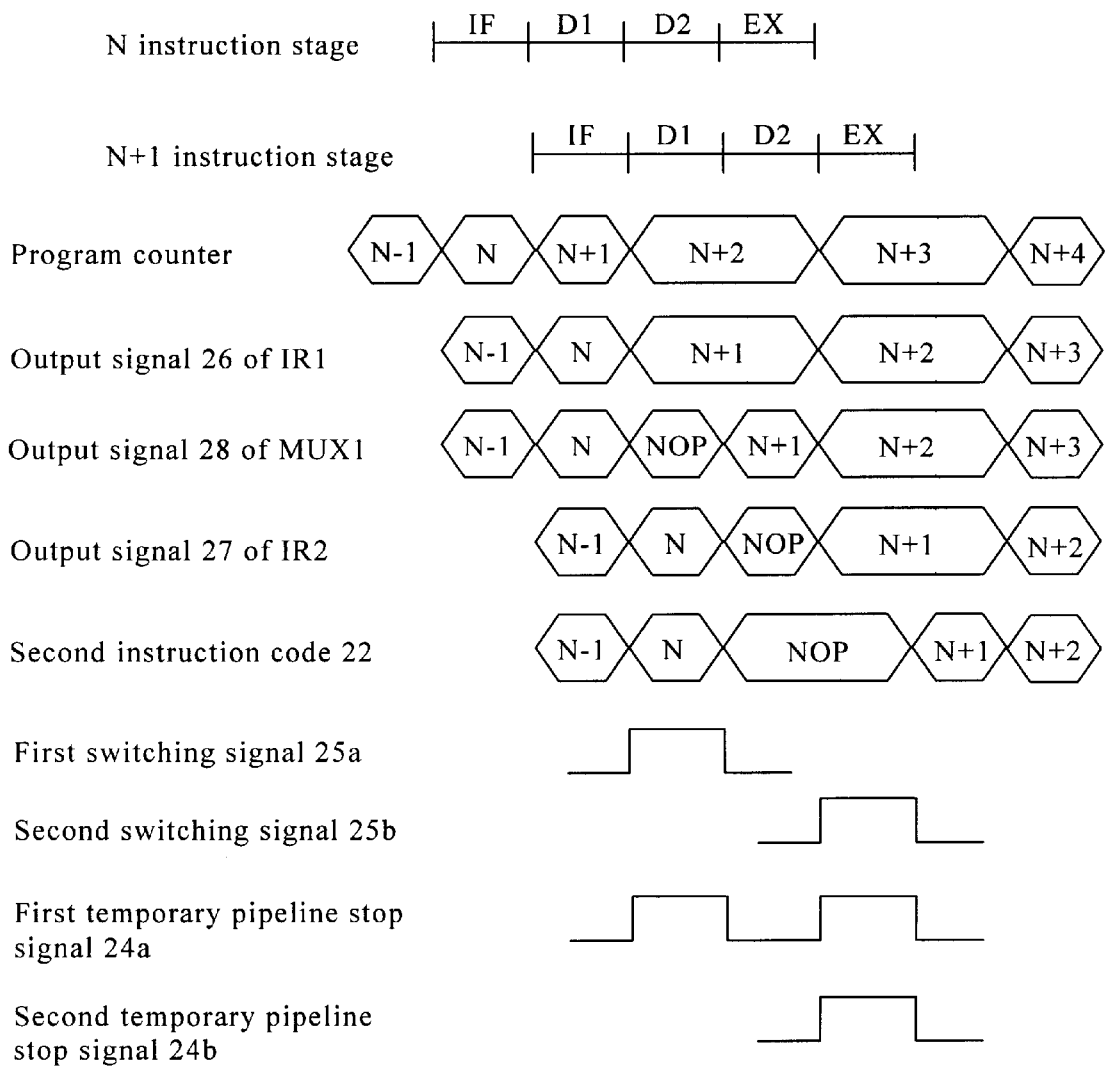
FIG. 19 is a timing chart showing a program control apparatus for four step pipeline according to Embodiment 3 of the present invention.

FIG. 13 shows the bit field of the preceding instruction code and following instruction code where the NOP field is assigned. The lowest Bit 0 is NOP fields. NOP number N=1 is directed when bit 0 is "1". FIG. 18 is a flow chart showing the outline of the processing flow of the program control apparatus of this Embodiment 3. FIG. 19 is a timing chart for a four step pipeline. The immediate value move operation (MOV PR, immediate value) and add operation (ADD GR, M(PR)) which includes the access to data memory is described as an example of the instruction.

The operation of this apparatus is described by the following steps:

(1) Step 1

The address which the program counter in the address generation part 2 maintains is outputted to the instruction code storage part 1. The instruction code storage part 1 reads out the preceding instruction code as the first instruction code 21 and outputs to the stall control part 3 corresponding to the inputted address.

(2) Step 2 and Step 3

In the stall control part 3, the first instruction register 11 latches the first instruction code 21, the multiplexer 12 selects the output of the first instruction register 11, and outputs as the second instruction code 28. The temporary pipeline stop part 13 outputs signal 28, and detects the instruction code where the NOP field is assigned or not by NOP field assigned instruction detection part 101.

(3) Step 4

The first instruction code 21 becomes output 28 of the first multiplexer 12, and the first instruction code 21 is inputted to the temporary pipeline stop part 13 and the second instruction register 14. The first instruction code 21 is outputted as the second instruction code 22 through the second instruction register 14 and the second multiplexer 15. When the signal 111, which is the lowest bit of the NOP field is, "1"(as shown by FIG. 19(*a*)), the temporary pipeline stop part 13 outputs one cycle of a first temporary pipeline stop signal 24*a* and a first switch signal 25*a*.

(4) Step 5

The first multiplexer 12 selects NOP code 23 according to the first switch signal 25*a* and outputs the output signal 28. The program counter maintains the address by the first temporary pipeline stop signal 24*a* and the first instruction register 12 latches the first instruction code 21.

(5) Step 6

The value of the program counter in address generation part 2 increases, the address generation part 2 outputs the updated address to the instruction code storage part 1, and the instruction code storage part 1 outputs the following instruction as the first instruction code 21 corresponding to the renewed address.

(6) Step 7

The first instruction register 11 latches the first instruction code 21, the first multiplexer 12 outputs the output signal 28 by selecting the latched output 26 from the first instruction register 11. The temporary pipeline stop part 13 inputs the output signal 28, and detects the instruction code where the NOP field is assigned by NOP field assigned instruction detection part 101.

(7) Step 8

When the signal 111, which is the lowest bit of the NOP field, is "1"(as shown by FIG. 19(*a*)), the temporary pipeline stop part 13 outputs one cycle of the second temporary pipeline stop signal 24*b* and the second switch signal 25*b*.

(8) Step 9

The output signal 28 of the first multiplexer 12 is input to the second instruction register 14, the second instruction register 14 latches the first instruction code 21 which is the following instruction according to the second temporary pipeline stop signal 24*b*. The second multiplexer 15 selects the NOP code 23 according to the second switch signal 25*b* and outputs the NOP code 23 as the second instruction code 22.

(9) Step 10

The second multiplexer 15 selects the output of the second instruction register 14 and outputs it as the second instruction code 22.

(10) Step 11

The process shifts to the next instruction processing stage.

According to the Embodiment 3, it is possible for the program control apparatus to perform the temporary stop the pipeline processing stage according to the judgment result whether there are NOP field in both inputted preceding instruction code and following instruction code respectively, and the stall control can be achieved. In short, the pipeline processing of the following instruction will be stopped temporarily according to the NOP field of the inputted preceding instruction, and the pipeline processing of the following instruction will be further stopped temporarily by NOP inserting according to the NOP field of the inputted following instruction, and the resource competition such as register interference etc., is avoided.

According to the embodiment shown above, the stall (delay time) ,the same as the Embodiment 1 and Embodiment 2, can be achieved in spite of reducing the assigned size of the NOP field from two bits to one bit. In the above-mentioned embodiment, the number of NOP specified by the bit row in the NOP field is explained as a binary value. Dedicated coding can be adopted that the combination of the bit row indicates specific value set previously. For instance, the combination of "0" and "1" shown by two bits indicate following specific value. "00" indicates 1, "01" indicates 2, "10" indicates 4, and "11" indicates 6. In a same manner, another dedicated coding of two bit row can be adopted as follows. "00" indicates 0, "01" indicates 3, "10" indicates 6, "11" indicates 9. By using this dedicated coding, when the available field space is small, it is especially effective that the numerical value of four or more can be specified by using two bits.

According to the program control method and the apparatus of this invention, the stall control can be achieved by inserting NOP of the predetermined number referring to the NOP field in the instruction code. When a preceding instruction and the following instruction causing resource competition is caused in the processing program, NOP is inserted after the preceding instruction is executed and the following instruction executes after NOP, the stall can be achieved by stopping the pipeline processing stage of the following instruction temporarily.

Moreover, according to the program control method and the apparatus of this invention, the NOP insertion for the stall control is executed by assigning the NOP field in the instruction code for smaller number of instruction between the preceding instruction and the following instruction, and an increase in the instruction code data amount can be suppressed.

Furthermore, according to the program control method and the apparatus of this invention, when the available field space for the NOP field in the instruction code is not enough, a stall control can be achieved by using both NOP field of the preceding instruction and the NOP field of the following instruction, and the program control method and the apparatus improved for the available field space compared with a conventional method can be provided.

The invention may be embodied in other forms without departing from the spirit or essential characteristics thereof The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A program control method for performing stall processing for a computer system wherein an instruction is operated by using a pipeline processing, when a preceding instruction and a following instruction causing a resource competition in a processing program, comprising:
    a step for assigning a NOP field in the preceding instruction code and the following instruction code respectively,
    a step for dividing a number of NOP necessary for stall processing and setting one of the divided number of NOP in the NOP field of the preceding instruction code and setting the other divided number of NOP in the NOP field of the following instruction code,
    a step for inserting set number of NOP specified in the preceding instruction after executing the preceding instruction corresponding to the preceding instruction code,
    a step for inserting set number of NOP specified in the following instruction before executing the following instruction corresponding to the following instruction code.

2. A program control apparatus for processing an instruction by using a pipeline processing which instruction includes NOP field for specifying a number of NOP to be inserted,
    wherein a kind of a following instruction is less than a kind of a preceding instruction, the NOP field is assigned to following instruction code,
    each preceding instruction code and following instruction code is inputted to the program control apparatus as a first instruction code,
    the program control apparatus comprising:
        an instruction code storage part for storing first instruction codes,
        an address generation part for generating address for outputting a first instruction code from the instruction code storage part, and
        a stall control part to which the first instruction code is inputted,
            for controlling an output of a stop signal to stop a pipeline processing stage to the address generation part temporarily based on a result of a detection whether the inputted first instruction code includes NOP field, and
            for controlling an output signal of either outputting the first instruction code or a NOP code as a second instruction code,
        wherein the stall control part comprises:
            a first instruction register to latch the first instruction code which read out from the instruction code storage part,
            a second instruction register to latch the first instruction code which is read out from the first instruction register,
            a switch part for inputting the first instruction code outputted from the second instruction register and NOP code, the switch part adapted for selecting and outputting either the first instruction code or NOP code as a second instruction code based on a switching signal,
            a temporary pipeline stop part for inputting the first instruction code which is outputted from the first instruction register, for detecting whether the inputted first instruction code is an instruction which includes NOP field or not, for controlling output of a stop signal to the address generation part and both the first instruction register and second instruction register based on the detecting result, and for controlling output of the switching signal to the switch part.

3. The program control apparatus according to claim 2, wherein
    the temporary pipeline stop part comprises:
        a NOP number counter for counting the number of NOP specified in the NOP field assigned in the instruction code and
        a detection part for detecting the inputted instruction code is an instruction which includes NOP field or not,
    wherein the detection part outputs the stop signal while specified cycles of pipeline processing stage corresponding to the NOP number which is outputted from the NOP number counter when detection part detects the inputted instruction is an instruction which includes the NOP field.

4. A program control apparatus for processing an instruction by using a pipeline processing which instruction includes NOP field for specifying a number of NOP to be inserted,
    wherein neither a preceding instruction nor a following instruction has enough available field space for the NOP field, the NOP field is separated and assigned to both preceding instruction code and following instruction code, each preceding instruction code and following instruction code is inputted to the program control apparatus as a first instruction code, the program control apparatus comprising:

an instruction code storage part for storing first instruction codes, an address generation part for generating address for outputting a first instruction code from the instruction code storage part, and a stall control part to which the first instruction code is inputted, for controlling an output of a stop signal to stop a pipeline processing stage to the address generation part temporarily based on a result of a detection whether the inputted first instruction code includes NOP field, and for controlling an output signal of either the first instruction code or a NOP code as a second instruction code, wherein the stall control part comprises:

a first instruction register to latch the first instruction code which read out from the instruction code storage part, a first switch part for inputting the first instruction code outputted from the first instruction register and NOP code, the switch part adapted for selecting and outputting either the first instruction code or NOP code based on a first switching signal, a second instruction register for latching the output signal of the first switch part, a second switch part for inputting the output signal outputted from the second instruction register and NOP code and for selecting and outputting either the output signal of the second instruction register or NOP code as a second instruction code based on a second switching signal, a temporary pipeline stop part for inputting the output signal which is outputted from the first switch part, for detecting whether the inputted signal is an instruction which includes NOP field or not, for controlling output of the stop signal to the address generation part and the first instruction register and another stop signal to the second instruction register based on the detecting result, and for controlling the output of the switching signal to the first switch part and the second switch part.

5. The program control apparatus according to claim 4, wherein the temporary pipeline stop part comprises:

a NOP number counter for counting the number of NOP specified in the NOP field assigned in the instruction code and a first detection part for detecting the inputted first instruction code is an instruction which includes NOP field, a second detection part for detecting the inputted second instruction code is an instruction which includes NOP field, wherein the first detection part outputs the stop signal while specified cycles of pipeline processing stage corresponding to the NOP number which is outputted from the NOP number counter when first detection part detects the inputted first instruction is an instruction which includes the NOP field, the second detection part outputs the stop signal while specified cycles of pipeline processing stage corresponding to the NOP number which is outputted from the NOP number counter when second detection part detects the inputted second instruction is an instruction which includes the NOP field.

6. A program control method for performing stall processing for a computer system wherein an instruction is operated by using a pipeline processing, when there is preceding instruction and following instruction causing the resource competition in a processing program, comprising:

in case that the number of the category of the preceding instruction is smaller than that of the following instruction, a step for assigning NOP field which indicates a number of NOP in the preceding instruction code, a step for decoding the preceding instruction code and inserting N pieces of NOP specified in the NOP field in the preceding instruction code after executing the preceding instruction corresponding to the instruction code, in case that the number of the category of the following instruction is smaller than that of the preceding instruction, a step for assigning NOP field which indicates a number of NOP in the following instruction code, a step for decoding the following instruction code and inserting N pieces of NOP specified in the NOP field in the following instruction code before executing the following instruction corresponding to the instruction code, in case that the field capacity which can be available as NOP field in neither preceding instruction nor following instruction, a step for assigning NOP field which indicates a number of NOP in the preceding instruction code and the following instruction code respectively, a step for dividing a number of NOP necessary for stall processing and setting one of the divided number of NOP in the NOP field of the preceding instruction code and setting the other divided number of NOP in the NOP field of the following instruction code, a step for decoding the preceding instruction code and inserting N pieces of NOP specified in the NOP field in the preceding instruction code after executing the preceding instruction corresponding to the instruction code, and decoding the following instruction code and inserting N pieces of NOP specified in the NOP field in the following instruction code before executing the following instruction corresponding to the instruction code.

* * * * *